(12) United States Patent
Vaidya et al.

(10) Patent No.: US 11,930,484 B2
(45) Date of Patent: Mar. 12, 2024

(54) METHODS AND APPARATUS FOR SYSTEM INFORMATION MANAGEMENT IN A WIRELESS SYSTEM

(71) Applicant: Charter Communications Operating, LLC, St. Louis, MO (US)

(72) Inventors: Maulik Vaidya, Escondida, CA (US); Ahmad Reza Hedayat, Carlsbad, CA (US); Amitav Mukherjee, Elk Grove, CA (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 208 days.

(21) Appl. No.: 16/830,062

(22) Filed: Mar. 25, 2020

(65) Prior Publication Data

US 2020/0314851 A1 Oct. 1, 2020

Related U.S. Application Data

(60) Provisional application No. 62/824,225, filed on Mar. 26, 2019.

(51) Int. Cl.
*H04W 72/044* (2023.01)
*H04L 1/00* (2006.01)
(Continued)

(52) U.S. Cl.
CPC ....... *H04W 72/0473* (2013.01); *H04L 1/0061* (2013.01); *H04W 16/14* (2013.01);
(Continued)

(58) Field of Classification Search
None
See application file for complete search history.

(56) References Cited

U.S. PATENT DOCUMENTS 6,859,435 B1 2/2005 Lee et al.
9,204,269 B1 12/2015 Cham et al.
(Continued)

FOREIGN PATENT DOCUMENTS

WO WO-2013131268 A1 9/2013
WO WO-2017074537 A1 * 5/2017 ........... H04L 1/0068
(Continued)

OTHER PUBLICATIONS

Author Unknown, Extended, overlapping SI-windows in NR-U, Doc. No. R2-1815048, pp. 1-4, Oct. 12, 2018.*
(Continued)

*Primary Examiner* — Christopher M Crutchfield
(74) *Attorney, Agent, or Firm* — Patent Beach PC

(57) ABSTRACT

Methods and apparatus for managing system information message transmission in a distribution network (e.g., a wireless network such as one compliant with 3GPP 5G NR-U). In one embodiment, transmission of multiple SI (System Information) messages with overlapping SI-windows is enabled but with no soft-combining support. In another embodiment, transmission of multiple SI-messages with overlapping SI-windows is enabled with soft-combining support. In yet another embodiment, aperiodic OSI transmission is enabled. Moreover, the present disclosure provides mechanisms for notifying UE of an SI change.

23 Claims, 15 Drawing Sheets

(51) Int. Cl.
*H04W 16/14* (2009.01)
*H04W 48/12* (2009.01)
*H04W 72/23* (2023.01)
*H04W 76/11* (2018.01)

(52) U.S. Cl.
CPC ........... *H04W 48/12* (2013.01); *H04W 72/23* (2023.01); *H04W 76/11* (2018.02)

(56) References Cited

U.S. PATENT DOCUMENTS

| | | |
|---|---|---|
| 11,057,865 B1 | 7/2021 | Wong |
| 2002/0188807 A1 | 12/2002 | Chaudhry et al. |
| 2005/0228971 A1 | 10/2005 | Samra et al. |
| 2012/0028592 A1 | 2/2012 | Pick et al. |
| 2012/0033612 A1 | 2/2012 | Jazra |
| 2014/0105028 A1 | 4/2014 | Bhaskaran et al. |
| 2014/0219236 A1 | 8/2014 | Uchino et al. |
| 2014/0226606 A1 | 8/2014 | Nishigori et al. |
| 2014/0281390 A1 | 9/2014 | Boland et al. |
| 2014/0286170 A1 | 9/2014 | Ericson et al. |
| 2014/0293860 A1 | 10/2014 | Hegde |
| 2014/0293908 A1* | 10/2014 | Kumar ............. H04W 72/1263 370/329 |
| 2014/0301193 A1 | 10/2014 | Liu et al. |
| 2015/0195754 A1 | 7/2015 | Zhang et al. |
| 2015/0208366 A1 | 7/2015 | Papasakellariou et al. |
| 2015/0282138 A1 | 10/2015 | Choi et al. |
| 2015/0359036 A1 | 12/2015 | Seo et al. |
| 2016/0219607 A1 | 7/2016 | You et al. |
| 2016/0227540 A1 | 8/2016 | Chen et al. |
| 2016/0241362 A1 | 8/2016 | El-Khamy et al. |
| 2017/0118108 A1 | 4/2017 | Avci et al. |
| 2017/0164234 A1 | 6/2017 | Kalapatapu et al. |
| 2017/0188259 A1 | 6/2017 | Van Phan et al. |
| 2017/0244651 A1 | 8/2017 | Saxton |
| 2017/0311247 A1 | 10/2017 | Qi et al. |
| 2017/0353586 A1 | 12/2017 | Leucht-Roth et al. |
| 2017/0359759 A1 | 12/2017 | Brown et al. |
| 2018/0254860 A1 | 9/2018 | Wong et al. |
| 2018/0288657 A1 | 10/2018 | Stojanovski et al. |
| 2018/0368199 A1 | 12/2018 | Zeng et al. |
| 2019/0045487 A1* | 2/2019 | You ........................ H04L 5/0044 |
| 2019/0052582 A1 | 2/2019 | Gaal et al. |
| 2019/0124633 A1* | 4/2019 | Hang ................ H04W 72/0446 |
| 2019/0215729 A1 | 7/2019 | Oyman et al. |
| 2019/0327031 A1 | 10/2019 | Fan et al. |
| 2019/0356743 A1 | 11/2019 | Park et al. |
| 2019/0357117 A1 | 11/2019 | Cudak et al. |
| 2020/0008224 A1* | 1/2020 | Ozturk ............. H04W 72/1273 |
| 2020/0053622 A1 | 2/2020 | Huang-Fu et al. |
| 2020/0068481 A1 | 2/2020 | Kim et al. |
| 2020/0196199 A1 | 6/2020 | Sharma et al. |
| 2020/0221464 A1 | 7/2020 | Nielsen et al. |
| 2020/0236728 A1 | 7/2020 | Yi et al. |
| 2020/0260330 A1 | 8/2020 | Zhu et al. |
| 2020/0342311 A1 | 10/2020 | Peroulas et al. |
| 2021/0014791 A1 | 1/2021 | Freda et al. |
| 2021/0029608 A1 | 1/2021 | Dodd-Noble et al. |
| 2021/0235465 A1 | 7/2021 | Meylan et al. |
| 2021/0258822 A1 | 8/2021 | Mukherjee et al. |
| 2021/0314858 A1 | 10/2021 | Wong et al. |
| 2021/0392615 A1 | 12/2021 | Wong et al. |

FOREIGN PATENT DOCUMENTS

| | | |
|---|---|---|
| WO | WO-2018031327 A1 | 2/2018 |
| WO | WO-2018203720 A1 | 11/2018 |
| WO | WO-2020037666 A1 | 2/2020 |
| WO | WO-2020103654 A1 | 5/2020 |
| WO | WO-2020198494 | 11/2020 |
| WO | WO-2021163601 A1 | 8/2021 |

OTHER PUBLICATIONS

Author Unknown, SI design in NR-U, Doc. No. R2-1817325, pp. 1-2, Nov. 16, 2018.*
Author Unknown, SI Update in NR-U, Doc. No. R2-1816314, pp. 1-2, Nov. 16, 2018.*
Author Unknown, System information enhancements for NR-U, Doc. No. R2-1816267, pp. 1-4, Nov. 16, 2018.*
Author Unknown, Enhancements for SI transmission on NR-U, Doc. No R2-1816835, pp. 1-3, Nov. 16, 2018.*
Author Unknown, Enhancements for SI transmission on NR-U, Doc. No R2-1816608, pp. 1-3, Nov. 16, 2018.*
Author Unknown, Mapping between SI Messages and SI Windows in NR-U, pp. 1-3, Doc. No. R2-1816317, Nov. 16, 2018.*
3GPP TS 38.300: "NR and NG-RAN Overall Description, Stage 2 (Release 15)".
3GPP TS 38.331: "NR; Radio Resource Control (RRC) protocol specification (Release 15)".
RP-182878, entitled "New WID on NR-based Access to Unlicensed Spectrum," Qualcomm, RAN#82, Dec. 2018.
Signaling Protocols and Procedures for Citizens Broadband Radio Service (CBRS): Spectrum Access System, (SAS)—Citizens Broadband Radio Service Device (CBSD) Interface Technical Specification—Document WINNF-TS-0016, Version V1.2.1.3, Jan. 3, 2018, 60 pages.
Wi-Fi Direct (including inter alia, "Wi-Fi Peer-to-Peer (P2P) Specification"), Version 1.5, 2014, Wi-Fi Alliance, 90 pages.
3GPP, "Group Radio Access Network, Evolved Universal Terrestrial Radio Access Network (E-UTRAN), User Equipment (UE) Radio Access Capability (Release 15)" Technical Specification, TS36.306 (V15.6.0), Sep. 2019, 117 pages.
3GPP TR 23.761 V1.1.1 (Oct. 2020); 3rd Generation Partnership Project; Technical Specification Group Services and System Aspects; Study on system enablers for devices having multiple Universal Subscriber Identity Modules (USIM) (Release 17) .
3GPP TS 23.501 v.15.4.0 (Dec. 2018) 3rd Generation Partnership Project; Technical Specification Group Services and System Aspects; System Architecture for the 5G System; Stage 2; Release 15, 236 pages.
3GPP TS 23.502 3rd Generation Partnership Project; Technical Specification Group Services and System Aspects; Procedures for the 5G System; Stage 2; v. 16.0.0, (Mar. 2019) 420 pages.
3GPP TS 23.503 V16.0.0 (Mar. 2019); 3rd Generation Partnership Project; Technical Specification Group Services and System Aspects; Policy and Charging Control Framework for the 5G System; Stage 2 (Release 16).
3GPP TS 38.460 V16.0.0 (Dec. 2019); 3rd Generation Partnership Project; Technical Specification Group Radio Access Network; NG-RAN; E1 general aspects and principles (Release 16).
3GPP., "Study on New Radio Access Technology, Radio Interface Protocol Aspects (Release 14)", Technical Specification Group Radio Access Network, Technical Report (TR 38.804), V14.0.0 (Mar. 2017), 57 pages.
Article 5 of the Radio Regulations (edition 2001), Introduction to International Radio Regulations, 161 pages.
Deering, S., et al., "Internet Protocol, Version 6 (IPv6) Specification," Internet Engineering Task Force (IETF) RFC 2460, Dec. 1998, 39 pages.
IEEE Std. 802.11 (1997), or related standards including 802.11 a/b/g/n/s/v/ac/ad/ax/ay/ba or 802.11-2012/2013, 802.11-2016, 459 pages.
"Internet Protocol, DARPA Internet Program, Protocol Specification", IETF RCF 791, Sep. 1981, 50 pages.
Nokia 5G New Radio (NR): Physical Layer Overview and Performance, IEEE Communication Theory Workshop, 2018 by A. Ghosh, May 15, 2018, 38 pages.

* cited by examiner

METHODS AND APPARATUS FOR SYSTEM INFORMATION MANAGEMENT IN A WIRELESS SYSTEM

PRIORITY

This application claims priority to U.S. Provisional Patent Application Ser. No. 62/824,225 filed Mar. 26, 2019 and entitled "METHOD AND APPARATUS FOR SYSTEM INFORMATION MANAGEMENT IN A WIRELESS SYSTEM", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of content delivery networks and specifically, in one or more exemplary embodiments, to methods and apparatus for managing system information in a content delivery network, including a wireless system utilizing unlicensed or quasi-licensed radio frequency (RF) spectrum, such as for example that utilized by 3GPP (3rd Generation Partnership Project) 5G NR-Unlicensed (NR-U) or MulteFire systems.

2. Description of Related Technology

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently, only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE). |
| | 1900 MHz PCS, Band 2 (GSM/GPRS/EDGE). |
| | 850 MHz Cellular, Band 5 (UMTS/HSPA + up to 21 Mbit/s). |
| | 1900 MHz PCS , Band 2 (UMTS/HSPA + up to 21 Mbit/s). |
| 4G | 700 MHz Lower B/C, Band 12/17 (LTE). |
| | 850 MHz Cellular, Band 5 (LTE). |
| | 1700/2100 MHz AWS, Band 4 (LTE). |
| | 1900 MHz PCS, Band 2 (LTE). |
| | 2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs (e.g., Wi-Fi) and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a node or "hotspot," a physical location at which the user may obtain access by connecting to modems, routers, APs, etc. that are within wireless range.

5G New Radio (NR) and NG-RAN (Next Generation Radio Area Network)—

NG-RAN or "NextGen RAN (Radio Area Network)" is part of the 3GPP "5G" next generation radio system. 3GPP is currently specifying Release 15 NG-RAN, its components, and interactions among the involved nodes including so-called "gNBs" (next generation Node B's or eNBs). NG-RAN will provide very high-bandwidth, very low-latency (e.g., on the order of 1 ms or less "round trip") wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB") which supports connectivity to both the EPC (Evolved Packet Core) and the NR "NGC" (Next Generation Core). FIG. 1 illustrates a 3GPP 5G NR network reference architecture.

Issues with Extant Approaches to System Information

In the exemplary context of NR, per 3GPP TS 38.300: "NR and NG-RAN Overall Description, Stage 2 (Release 15)", incorporated herein by reference in its entirety, System Information (SI) consists of a MIB and a number of SIBs, which are divided into Minimum SI and Other SI (OSI). The transmission schedule of OSI data is indicated in SIB1. Different SIBs can have different periodicities. SIBs with the same periodicity are allocated to the same SI message, and every SI message is associated with a periodic SI-window within which the SI message should be transmitted. The CRC of the PDCCH/PDSCH of the SI messages are scrambled with the SI Radio Network Temporary Identifier (SI-RNTI, discussed in greater detail subsequently herein). The SI-windows of the different SI messages have different periodicities, are non-overlapping, and they all have the same duration. A receiving UE can leverage the aforementioned non-overlapping property of the SI-windows to identify which SI message it receives (and hence which SIBs the SI message contains), but it is also possible to identify the SIBs in an SI message by parsing the SI message. To indicate that a PDSCH transmission contains an SI message, the PDCCH scheduling DCI (which allocates the PDSCH transmission resources) is scrambled with the SI-RNTI.

In the specific context of NR-U (New Radio Unlicensed), various proposals have been put forth relating to SI data and management. See, e.g., work item description (WID) RP-182878, entitled "New WID on NR-based Access to Unlicensed Spectrum," Qualcomm, RAN #82, December 2018 (hereinafter "RP-182878", incorporated herein by reference in its entirety), wherein system information (SI) transmission was identified as a subject requiring enhancements compared to the operation in licensed bands in the baseline 3rd Generation Partnership Project (3GPP) NR specification (Release 15 NG-RAN).

However, due to constraints of unlicensed channel operation, SI transmission may be interrupted if the gNB fails LBT (listen-before-talk) protocols before the scheduled SI transmission. In NR, notifications of coming SI updates are carried via a short message included in the downlink control information (DCI) on the PDCCH. Due to such potential LBT failures in the context of unlicensed spectrum, it is not guaranteed that a gNB will deliver paging messages in all paging occasions (POs) of the paging DRX cycle during one SI modification period. When this situation occurs, a UE may not be informed of the coming SI update. This is obviously an undesirable condition.

Additionally, although SI transmission has been addressed in Release 15 NG-RAN, due to some regulatory aspects of operation in unlicensed bands, changes are necessary in order for the user equipment (UE) to receive SI without interruption and significant delay.

Accordingly, solutions are needed to, inter alia, enable a user device such as a 5G NR UE to identify system information data, including in situations where LBT failures may occur (such as during unlicensed operation).

SUMMARY

The present disclosure addresses the foregoing needs by providing, inter alia, methods and apparatus for managing system information (SI) in a content wireless network, such as one which provides content delivery services to subscribers.

In a first aspect of the disclosure, a computerized method of providing system information in a wireless network is described. In one embodiment, the computerized method includes: determining to utilize a plurality of overlapping temporal windows for transmission of the system information; based on the determining, scrambling control information with distinguishing identifier data; and transmitting the scrambled control information to one or more user devices.

In one variant of the method, the determining to utilize the overlapping temporal windows includes determining to utilize the overlapping temporal windows based at least on utilization of a prescribed wireless protocol.

In another variant, the prescribed wireless protocol includes a 3GPP (Third Generation Partnership Program) 5G NR-Unlicensed (NR-U) protocol.

In yet another variant, the determining to utilize the overlapping temporal windows includes determining to utilize the overlapping temporal windows based on determining that an available bandwidth of an unlicensed carrier frequency or frequency band utilized in servicing the one or more user devices meets or exceeds a pre-defined threshold.

In a further variant, the system information includes 3GPP 5G NR System Information; the overlapping temporal windows includes overlapping SI-windows; and the scrambling of the control information with identifier data includes scrambling at least portions of downlink control information (DCI) with a DOSI-RNTI (Downlink OSI-Radio Network Temporary Identifier). In one implementation thereof, the scrambling of the control information with identifier data includes scrambling at least portions of downlink control information (DCI) with a DOSI-RNTI (Downlink OSI-Radio Network Temporary Identifier) includes scrambling a cyclic redundancy check (CRC) of one or more frames of the DCI, the one or more frames carrying one or more respective SI messages with the overlapping SI-windows, the scrambling utilizing a value that is (i) different than a unique value associated with an SI-RNTI used with non-overlapping SI-windows, and (ii) within a range of prescribed values.

In still a further variant of the method, the control information includes two or more system information blocks (SIBs); the computerized method further includes allocating the two or more SIBs into a single SI-message; and the transmitting of the scrambled control information includes transmitting the single SI-message for at least a periodicity duration of each of the two or more SIBs allocated thereto.

In another aspect of the disclosure, a computerized user device configured to receive system information (SI) is described. In one embodiment, the computerized user device includes: digital processor apparatus; wireless interface apparatus in data communication with the digital processor apparatus and configured for wireless communication with at least one radio area network (RAN) utilizing a first wireless access technology; and storage apparatus in data communication with the digital processor apparatus and comprising a storage medium, the storage medium comprising at least one computer program.

In one variant, the at least one computer program is configured to, when executed on the digital processor apparatus: receive scrambled control information, the control information having been scrambled with an overlapping SI identifier; detect at least one SI-message in the scrambled control information; and identify at least one data structure associated with the at least one SI-message.

In one implementation thereof, the at least one data structure of the at least one SI-message includes one or more system information blocks (SIBs), and the identification of the at least one data structure includes identification of the one or more SIBs using at least an Abstract Syntax Notation One (ASN.1) CHOICE structure.

In another implementation, the at least one message includes a plurality of SI-messages within a common window period, and the at least one computer program is further configured to, when executed, perform a soft-combining process on at least portions of the plurality of SI-messages, the soft-combination comprising a combination of soft-bits of a first Physical Downlink Shared Channel (PDSCH) or Physical Downlink Control Channel (PDCCH) with soft-bits obtained from a second PDSCH or PDCCH, the soft-bits of both the first and second PDSCH's or PDCCH's comprising bits decoded utilizing forward error correction (FEC).

In yet another implementation, the at least one computer program is further configured to, when executed on the digital processor apparatus, de-scramble the scrambled control information, the de-scrambling comprising decoding the at least one SI-message utilizing a distinguishing overlapping identifier, the distinguishing overlapping identifier comprising data indicative of a value that is different than a value associated with an identifier used by the computerized user device during a mode of operation of the computerized user device wherein non-overlapping SI-windows are used.

In another implementation, the at least one computer program is further configured to, when executed on the digital processor apparatus, de-scramble the scrambled control information, the de-scrambling comprising decoding the SI-message utilizing the overlapping SI identifier, the overlapping SI identifier comprising an identifier uniquely associated with a plurality of system information blocks (SIBs) within the SI-message.

In yet a further implementation, the at least one computer program is further configured to, when executed on the digital processor apparatus: receive a plurality of SI-messages within a single SI-window; utilize a plurality of respective overlapping SI-identifiers in accordance with a prescribed sequence to identify one of the plurality of SI-identifiers enabling decode of a respective one of the plurality of SI-messages; based on an inability of the plurality of the plurality of SI-identifiers to decode any of the plurality of SI-messages, monitor an unlicensed carrier for receipt of a then-next one of the plurality of SI-messages within the single SI-window; and utilize the plurality of respective overlapping SI-identifiers in accordance with the prescribed sequence to identify one of the plurality of SI-identifiers configured to decode the then-next one of the plurality of SI-messages within the single SI-window, the one of the plurality of SI-identifiers enabling decode of the then-next one of the plurality of SI-messages within the single SI-window comprising an identifier uniquely associated with a plurality of system information blocks (SIBs) within the then-next one of the plurality of SI-messages.

In yet another implementation, the at least one computer program is further configured to, when executed on the digital processor apparatus, conduct a brute force (checksum) computation on the scrambled control information.

In another aspect of the disclosure, a wireless access node apparatus configured to manage system information (SI) transmission in a wireless network is disclosed. In one embodiment, the wireless access node apparatus includes: a digital processor apparatus; a wireless network interface in data communication with the digital processor apparatus; and a computer readable storage apparatus in data communication with the digital processor apparatus and comprising a storage medium including at least one computer program.

In one variant, the at least one computer program is configured to, when executed on the digital processor apparatus, cause the wireless access node apparatus to: invoke an overlapping SI-window protocol; based at least in part on the invocation of the overlapping SI-window protocol, scramble downlink control information using at least one overlapping SI-identifier; and transmit the scrambled downlink control information to at least one user device.

In one implementation of the access node apparatus, the wireless access node apparatus includes a 3GPP-compliant gNodeB (gNB); the at least one overlapping SI-identifier includes a unique overlapping SI-RNTI (UOSI-RNTI); and the scrambled downlink control information includes one or more SI-messages, each of the one or more SI-messages comprising a single system information block (SIB).

In one configuration, the UOSI-RNTI includes a value within a variable range of 0001-0008.

In another configuration, the UOSI-RNTI includes a value within a variable range of 0009-FFEF.

In yet another configuration, the UOSI-RNTI includes a value associated with a one of a plurality of fields, the plurality of fields comprising FFF0-FFFD.

In another implementation, the scrambling of the downlink control information with the at least one overlapping identifier includes scrambling of at least one SI-message with an identifier uniquely associated with a plurality of system information blocks (SIBs) within this SI-message, the plurality of SIBs relating to each other.

In a further aspect, methods and apparatus for a user device (e.g., 5G NR UE) to identify system information data utilizing overlapping SI windows are disclosed. In one embodiment, the methods and apparatus are disclosed in the context of a 3GPP 5G NR unlicensed network, and include no soft-combining support. In another embodiment, the methods and apparatus utilize overlapping windows, but with soft-combining support.

In another aspect of the disclosure, methods and apparatus for supporting soft-combining utilizing an overlapping SI-windows based approach are disclosed.

In a further aspect, methods and apparatus for notification of a user device (e.g., 3GPP UE) of one or more impending SI updates are disclosed.

In another aspect, methods and apparatus for aperiodic OSI data transmission are disclosed. In one embodiment, a 3GPP 5G NR gNB can transmit OSI data outside of a prescribed SI window. This approach allows, inter alia, the gNB to compensate for any LBT failures within a SI window.

In another aspect of the disclosure, computerized network apparatus is disclosed. In one embodiment, the apparatus is configured for transmitting system information (SI) and/or updates thereto, and includes at least a server apparatus. In another variant, the network apparatus includes a 3GPP gNB apparatus.

In one variant, the apparatus includes: processor apparatus; network interface apparatus in data communication with the processor apparatus; and storage apparatus in data communication with the processor apparatus, the storage apparatus including at least one computer program.

In one implementation, the at least one computer program is configured to, when executed on the processor apparatus: allocate one or more system information blocks (SIBs) into a single SI-message; initiate a listen-before-talk (LBT) process; and based on success of the LBT process, scramble the SI-message with an OSI-RNTI and transmit the SI-message within a SI-window. Alternatively, the SI-message may be scrambled before or during performance of the LBT process.

In another implementation, the at least one computer program is configured to, when executed on the processor apparatus: allocate one or more system information blocks (SIBs) into a single SI-message; initiate a listen-before-talk (LBT) process; and based on success of the LBT process, scramble the SI-message with an RNTI unique to itself and different than an SI-RNTI and transmit the SI-message within a SI-window.

In another aspect of the disclosure, computer readable apparatus is disclosed. In one variant, the computer readable apparatus includes a non-transitory storage medium, the non-transitory medium including at least one computer program having a plurality of instructions. In one implementation, the plurality of instructions are configured to, when executed on a processing apparatus: receive an OSI outside of a pre-determined SI-window; identify an RNTI; and utilize the identified RNTI to determine SIB(s) within the OSI.

In a further aspect of the disclosure, soft-combining one or more overlapping windows is enabled. In one embodiment, the soft-combination includes a combination of soft-bits of a first Physical Downlink Shared Channel (PDSCH) or Physical Downlink Control Channel (PDCCH) with soft-bits obtained from a second PDSCH or PDCCH. In one variant, the soft-bits of both the first and second PDSCH's or PDCCH's include bits decoded utilizing forward error correction (FEC).

In a further aspect of the disclosure, notifications of SI updates are carried via a short message. In one embodiment, based on a listen-before-talk (LBT) failure preventing delivery of a paging message in a paging occasion (PO) of a paging discontinuous reception (DRX) cycle, a short message is transmitted in one or more subsequent discovery reference signal (DRS) transmissions. In one variant, the short message indicates an SI change. In one implementation, the indication of the SI change notifies a UE of an SI change such that the UE checks one or more subsequent SI-windows to decode one or more respective SI-messages therein.

In another aspect of the present disclosure, a computerized method is disclosed. In one embodiment, the computerized method includes: determining to employ overlapping SI-windows; based on the determining, scrambling downlink control information (DCI) with overlapping SI-RNTI (OSI-RNTI); and transmitting the scrambled DCI to user equipment (UE). In one variant, the OSI-RNTI is a distinguishing overlapping SI-RNTI (DOSI-RNTI). In another variant, the OSI-RNTI is a unique overlapping SI-RNTI (UOSI-RNTI).

In another aspect of the present disclosure, a computerized mobile device is disclosed. In one embodiment, the computerized mobile device is implemented to receive system information (SI) and/or SI updates. In one variant, the computerized mobile device includes: digital processor apparatus; wireless interface apparatus in data communication with the digital processor apparatus; and storage apparatus in data communication with the digital processor apparatus. In one implementation, the wireless interface apparatus is implemented for wireless communication with at least one radio area network (RAN) utilizing a wireless access technology such as 3GPP 5G NR-U.

In another implementation, the storage apparatus includes a storage medium, having at least one computer program. In a further implementation, the at least one computer program is implemented to, when executed on the digital processor apparatus: receive downlink control information (DCI), wherein the DCI is scrambled with an overlapping SI-RNTI (OSI-RNTI); detect an SI-message in the scrambled DCI; and identify the SI-message from a data structure. According to further implementations, the OSI-RNTI can be a distinguishing overlapping SI-RNTI (DOSI-RNTI) or a unique overlapping SI-RNTI (UOSI-RNTI).

In another aspect of the disclosure, a wireless access node apparatus is disclosed. In one embodiment, the wireless access node apparatus includes: a digital processor apparatus; a wireless network interface, and a computer readable storage medium. In one variant, the computer readable storage medium includes at least one computer program. In one implementation, the at least one computer program is configured to, when executed on the digital processor apparatus, cause the wireless access node apparatus to: determine to employ overlapping SI-windows; scramble downlink control information (DCI) with overlapping SI-RNTI (OSI-RNTI); and transmit the scrambled DCI to user equipment (UE).

In additional aspect of the disclosure, computer readable apparatus is described. In one embodiment, the apparatus includes a storage medium configured to store one or more computer programs, and includes a program memory or HDD or SSD on a computerized device such as a 5G gNB or a UE.

In a further aspect, an integrated circuit (IC) apparatus configured to implement one or more of the foregoing methods or functions is disclosed. In one embodiment, the IC apparatus is one or more devices (e.g., a chipset) which is used within a 3GPP NR-U gNB or UE. In one variant, the IC apparatus includes a SoC (system on chip) device. In another variant, the IC apparatus is an ASIC. In another variant, the IC apparatus is an FPGA, or a reconfigurable apparatus such as an RCF.

These and other aspects shall become apparent when considered in light of the disclosure provided herein.

Figure 1:
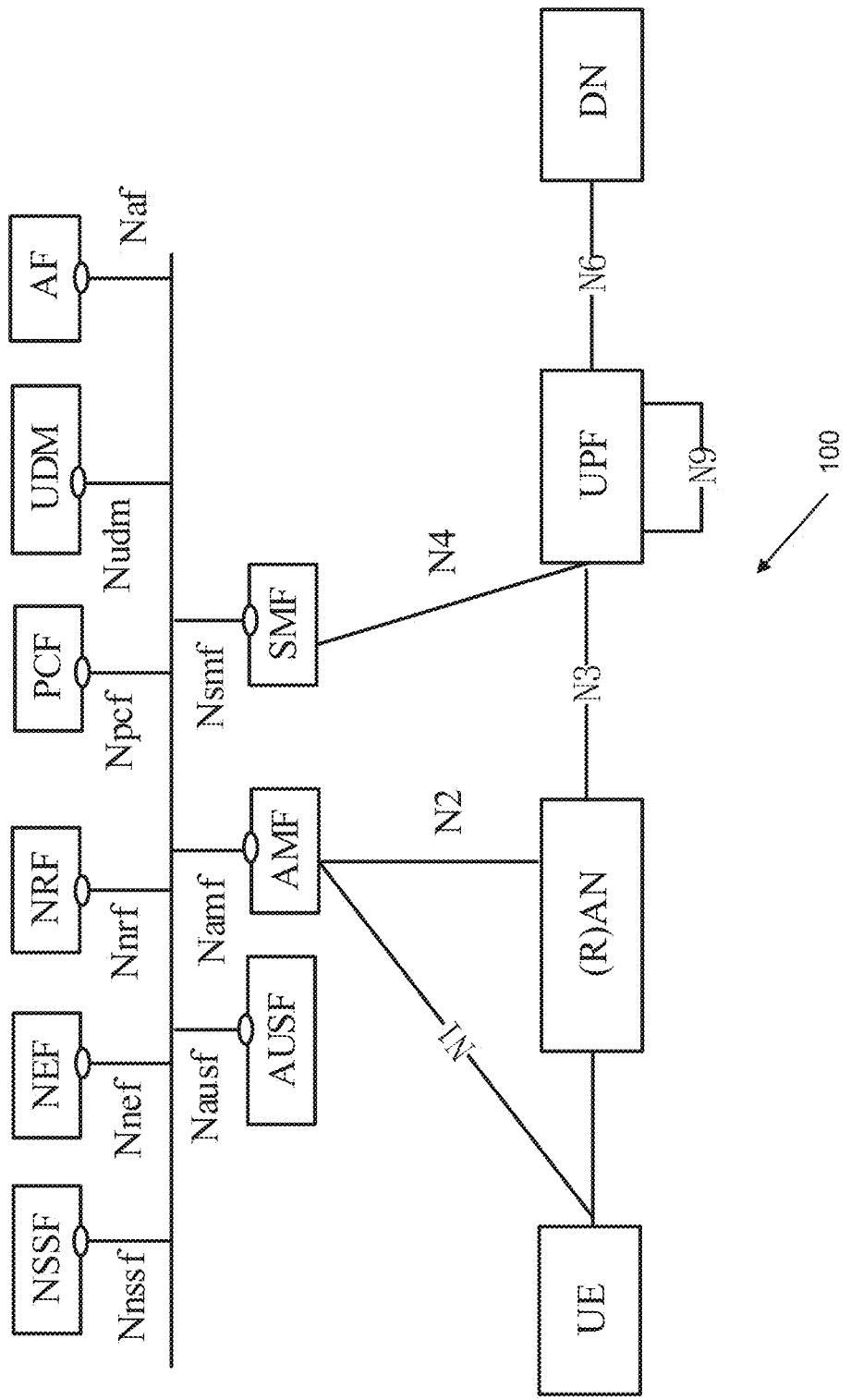
FIG. 1 is block diagram of a prior art 3GPP 5G NR reference architecture.

All figures © Copyright 2019-2020 Charter Communications Operating, LLC. All rights reserved.

DETAILED DESCRIPTION

Reference is now made to the drawings wherein like numerals refer to like parts throughout.

As used herein, the term "access node" refers generally and without limitation to a network node which enables communication between a user or client device and another entity within a network, such as for example a CBRS CBSD, a Wi-Fi AP, or a Wi-Fi-Direct enabled client or other device acting as a Group Owner (GO).

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "CBRS" refers without limitation to the CBRS architecture and protocols described in *Signaling Protocols and Procedures for Citizens Broadband Radio Service (CBRS): Spectrum Access System (SAS)—Citizens Broadband Radio Service Device (CBSD) Interface Technical Specification*—Document WINNF-TS-0016, Version V1.2.1. 3, Jan. 2018, incorporated herein by reference in its entirety, and any related documents or subsequent versions thereof.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, over-the-top services, streaming services, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), and 4G/4.5G LTE.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A/LTE-U/LTE-LAA, 5G NR, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB 2.0, 3.0. OTG), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), LTE/LTE-A/LTE-U/LTE-LAA, Wi-Fi (802.11), WiMAX (802.16), Z-wave, PAN (e.g., 802.15), or power line carrier (PLC) families.

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "SAS (Spectrum Access System)" refers without limitation to one or more SAS entities which may be compliant with FCC Part 96 rules and certified for such purpose, including (i) Federal SAS (FSAS), (ii) Commercial SAS (e.g., those operated by private companies or entities), and (iii) other forms of SAS.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac or 802.11-2012/2013, 802.11-2016, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE, 3G (3GPP/3GPP2), HSDPA/HSUPA, TDMA, CBRS, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A/LTE-U/LTE-LAA, 5G NR, analog cellular, CDPD, satellite systems, millimeter wave or microwave systems, acoustic, and infrared (i.e., IrDA).

As used herein, the term "xNB" refers to any 3GPP-compliant node including without limitation eNBs (eU-TRAN) and gNBs (5G NR).

Overview

In one exemplary aspect, the present disclosure provides improved methods and apparatus for removing the non-overlapping system information (SI)-window restriction presently employed in 3GPP 5G New Radio (NR). In other words, the improved methods and apparatus introduce the concept of overlapping SI-windows. In one variant, notifications of coming SI updates are carried via a short message included in extant data or control structures (such as e.g., the DCI on the PDCCH). Advantageously, the exemplary solutions of the resent disclosure also avoid LBT (listen before talk)-related failures when operating in unlicensed spectrum.

Additionally, mechanisms to address other potential issues with use of overlapping SI-windows, including use of "soft-combining" (wherein a given UE is able to decode an SI-message when the SI-message is transmitted multiple times within the same SI-window, and the UE combines multiple received copies of the SI-message) are disclosed herein.

Hence, exemplary embodiments of the disclosure utilize varying combinations of overlapping windows and other such mechanisms. In one such combination, transmission of multiple SI-messages with overlapping SI-windows is enabled but with no soft-combining support (i.e., when transmission of the SI-message outside the periodicity duration). Specifically, one or more SI-messages are scrambled with an RNTI different than SI-RNTI. This embodiment advantageously reduces the processing overhead, especially at the UE-side, whereby the DCI is de-scrambled with CRC value, because the decoding choices for receiving this SI-message include only two RNTIs: (i) SI-RNTI and (ii) DOSI-RNTI.

In another exemplary combination, transmission of multiple SI-messages with overlapping SI-windows is enabled with soft-combining support. In this approach, to facilitate transmission of SI messages without extending SI windows, the present disclosure provides allocating multiple SIBs to the same SI message, and scrambling the multiple SIBs by a unique SI-RNTI that identifies the set of SIBs included in the SI message. Additionally, to enable soft-combining, the same SI message can be repeated across the SI-window. Accordingly, the SI-windows duration need not be altered compared to the current NR baseline.

In yet another exemplary approach, a gNB may transmit OSIs outside a SI window, hereinafter referred to as "aperiodic OSI transmission" or "opportunistic OSI transmission." This advantageously allows the gNB to compensate for any LBT failures within a SI window.

In yet a further approach disclosed herein, when an LBT failure prevents a gNB to deliver paging message in a PO of the paging DRX cycle (during one SI modification period), the gNB may carry a Short Message, indicating an SI change, in the subsequent DRS transmission (or several subsequent DRS transmission). Such indication helps those UEs (that might have not detected any paging in their calculated PO) to be notified of a SI change to check for new SI.

DETAILED DESCRIPTION OF EXEMPLARY EMBODIMENTS

Exemplary embodiments of the apparatus and methods of the present disclosure are now described in detail. While these exemplary embodiments are described in the context of the previously mentioned wireless access nodes (e.g., gNBs and eNBs) associated with or supported at least in part by a managed network of a service provider (e.g., MSO), other types of radio access technologies ("RATs"), and/or other types of networks and architectures that are configured to deliver digital data (e.g., text, images, games, software applications, video and/or audio) may be used consistent with the present disclosure. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed venue, or other type of premises), the present disclosure may be readily adapted to other types of environments including, e.g., outdoors, commercial/retail, or enterprise domain (e.g., businesses), or even governmental uses, such as those outside the proscribed "incumbent" users such as U.S. DoD and the like. Yet other applications are possible.

Moreover, while various aspects of the present disclosure are described in detail with respect to so-called 5G "New Radio" (3GPP Release 15 and TS 38.XXX Series Standards and beyond), including NR-Unlicensed (NR-U)(3GPP Release 16)—such aspects are generally access technology "agnostic" and hence may be used across different access technologies, including so-called "4G/4.5G" 3GPP Standards (aka LTE/LTE-A)—including allocation/use/withdrawal of CBRS/unlicensed spectrum such as LTE-U, LTE-LAA, MulteFire in 5 GHz, etc.

Other features and advantages of the present disclosure will immediately be recognized by persons of ordinary skill in the art with reference to the attached drawings and detailed description of exemplary embodiments as given below.

Methods

Various methods and embodiments thereof for managing SI-message transmission with overlapping SI-windows according to the present disclosure are now described with respect to FIGS. 3-8. However, before describing the various solutions presented herein in detail, it is useful to first understand extant and proposed 3GPP protocols and mechanisms for SI data utilization.

As a brief aside, the Master Information Block (MIB) on the 5G NR Physical Broadcast Channel or PBCH provides the UE with parameters (e.g. CORESET #0 configuration) for monitoring of the Physical Downlink Control Channel (PDCCH) for scheduling the physical Downlink Shared Channel (PDSCH) that carries the System Information Block 1 (SIB1), the latter which defines the scheduling of other information blocks and includes initial access information.

The PBCH may also indicate that there is no associated SIB1, in which case the UE may be pointed to (i) another frequency to search for an SSB that is associated with a SIB1, as well as (ii) a frequency range where the UE may assume that no SSB associated with SIB1 is present. The indicated frequency range of (ii) is confined within a contiguous spectrum allocation of the same operator in which SSB is detected.

In the context of NR, per 3GPP TS 38.300: "NR and NG-RAN Overall Description, Stage 2 (Release 15)", incorporated herein by reference in its entirety, System Information (SI) consists of a MIB and a number of SIBs, which are divided into Minimum SI and Other SI (OSI). Specifically:

Minimum SI (MSI) comprises basic information required for initial access and information for acquiring any other SI. Minimum SI consists of:

MIB contains cell barred status information and essential physical layer information of the cell required to receive further system information, e.g. CORESET #0 configuration. MIB is periodically broadcast on BCH.

SIB1 defines the scheduling of other system information blocks and contains information required for initial access. SIB1 is also referred to as Remaining Minimum SI (RMSI) and is periodically broadcast on DL-SCH or sent in a dedicated manner on DL-SCH to UEs in RRC_CONNECTED.

Other SI (OSI) encompasses all SIBs not broadcast in the Minimum SI. Those SIBs can either be periodically broadcast on DL-SCH, broadcast on-demand on DL-SCH (i.e. upon request from UEs in RRC_IDLE or RRC_INACTIVE), or sent in a dedicated manner on DL-SCH to UEs in RRC_CONNECTED. OSI consists of:

SIB2 contains cell re-selection information, mainly related to the serving cell;

SIB3 contains information about the serving frequency and intra-frequency neighbouring cells relevant for cell re-selection (including cell re-selection parameters common for a frequency as well as cell specific re-selection parameters);

SIB4 contains information about other NR frequencies and inter-frequency neighbouring cells relevant for cell re-selection (including cell re-selection parameters common for a frequency as well as cell specific re-selection parameters);

SIB5 contains information about E-UTRA frequencies and E-UTRA neighbouring cells relevant for cell re-selection (including cell re-selection parameters common for a frequency as well as cell specific re-selection parameters);

SIB6 contains an ETWS primary notification;

SIB7 contains an ETWS secondary notification;

SIB8 contains a CMAS warning notification;

SIB9 contains information related to GPS time and Coordinated Universal Time (UTC)."

Figure 2:
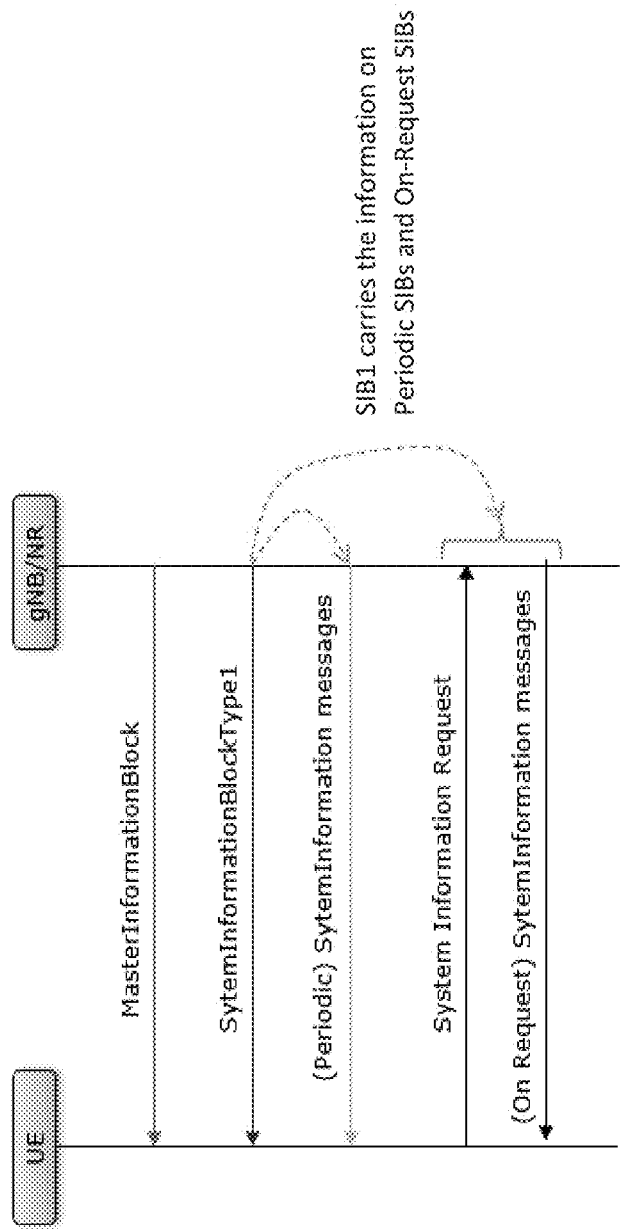
FIG. 2 is a ladder diagram illustrating the communication flow according to a prior art SI acquisition procedure in NR.

FIG. 2 shows an exemplary prior art SI acquisition procedure within NR. SIB1 carries the information on Periodic SIBs and On-Request SIBs.

Additionally, the identifiers (i.e., RNTIs (Radio Network Temporary Identifiers)) used by NR connected to the 5G Core Network (5GC) for SI transmission are as follows:

P-RNTI: identification of Paging and System Information change notification in the downlink; and SI-RNTI: identification of Broadcast and System Information in the downlink.

A short message transmitted with the P-RNTI over the DCI (Downlink Control Information—(see clause 6.5 of 3GPP TS 38.331: "NR; Radio Resource Control (RRC) protocol specification (Release 15)", incorporated herein by reference in its entirety) on the PDCCH is used to inform the UE in the RRC_IDLE, RRC_INACTIVE and RRC_CONNECTED states regarding a system information change. If the UE receives a Short Message with a system information change indication, it knows that the system information (other than for Earthquake and Tsunami Warning System (ETWS) and Commercial Mobile Alert System (CMAS)) will change at the next modification period boundary.

The System Information RNTI (SI-RNTI) is used for broadcast of system information. It is a common RNTI; i.e. it is not allocated to any UE explicitly—instead it is common to all UE's in a given cell. In the baseline 5G NR specification, a single SI-RNTI is used to address all SI messages, and is set to a fixed value of FFFF (hexadecimal). A UE obtains the scheduling information for PDSCH carrying an SI from the DCI in a PDCCH whose Cyclic Redundancy Check (CRC) is scrambled by SI-RNTI.

Notifications of incoming SI updates are carried via a short message included in the DCI (Downlink Control Information) on the PDCCH (without a scheduled PDSCH). A UE in RRC_IDLE and RRC_INACTIVE state monitors its regular paging occasions (POs). For example, a UE in RRC_IDLE state checks for paging messages once every discontinuous receive (DRX) cycle. The PO within the paging frame (PF) defines the specific subframe during which a UE checks for a paging message. A UE in RRC_CONNECTED state can monitor any PO for SI update notifications.

Table 1 illustrates the NR DCI format 1_0 with CRC scrambled by P-RNTI:

TABLE 1

| Field (Item) | Bits | Note |
| --- | --- | --- |
| Short Message Indicator | 2 | See Table 2 |
| Short Messages | 8 | See Table 3 |
| Frequency domain resource assignment | V | Variable with DL BWP |
| Time domain resource assignment | 4 | |
| VRB-to-PRB mapping | 1 | 0/1: Non-Interleaved/Interleaved |
| Modulation and coding scheme | 5 | |
| TB Scaling | 2 | |
| Reserved | 6 | Reserved |

Table 2 illustrates the NR Short Message indicator [Source: 3GPP TS 38.212: "NR: Multiplexing and channel coding"-Table 7.3.1.2.1]:

TABLE 2

| Bit Field | Short Message Indicator |
| --- | --- |
| 00 | Reserved |
| 01 | Only scheduling information for Paging is present in the DCI |
| 10 | Only short message is present in the DCI |
| 11 | Both scheduling information for Paging and short message are present in DCI |

Table 3 illustrates the Short messages [Source: 3GPP TS 38.331: "NR; Radio Resource Control (RRC); Protocol specification"-Table 6.5-1]:

TABLE 3

| Bit | Short Message Indicator |
| --- | --- |
| 1 | If set to 1: BCCH modification other than SIB6, SIB7 and SIB8 |
| 2 | If set to 1: an ETWS primary and/or an ETWS secondary and/or a CMAS notification |
| 3-[8] | Not used |

3GPP TS 38.212: "NR: Multiplexing and channel coding" clause 7.3.1.2.1 defines DCI format 1_0 for when CRC is scrambled with SI-RNTI: The following information is transmitted by means of the DCI format 1_0 with CRC scrambled by SI-RNTI:

Frequency domain resource assignment $-\lceil \log_2 (N_{RB}^{DL,BWP}(N_{RB}^{DL,BWP}+1)/2) \rceil$ bit $N_{RB}^{DL,BWP}$ is the size of CORESET 0 if CORESET 0 is configured for the cell and $N_{RB}^{DL,BWP}$ is the size of initial DL bandwidth part if CORESET 0 is not configured for the cell Time domain resource assignment—4 bits as defined in Subclause 5.1.2.1 of [6, TS 38.214]

VRB-to-PRB mapping—1 bit according to Table 7.3.1.1.2-33

Modulation and coding scheme—5 bits as defined in Subclause 5.1.3 of [6, TS 38.214], using Table 5.1.3.1-1

Redundancy version—2 bits as defined in Table 7.3.1.1.1-2

System information indicator—1 bit as defined in Table 7.3.1.2.1-2

Reserved bits—[15] bits

As previously noted, the transmission schedule of OSI data is indicated in SIB1. Different SIBs can have different periodicities. SIBs with the same periodicity are allocated to the same SI message, and every SI message is associated with a periodic SI-window within which the SI message should be transmitted. The CRC of the PDCCH/PDSCH of the SI messages are scrambled with the SI Radio Network Temporary Identifier (SI-RNTI).

Under prevailing NR protocols, the SI-windows of the different SI messages have different periodicities, are non-overlapping, and they all have the same duration. A receiving UE can leverage the aforementioned non-overlapping property of the SI-windows to identify which SI message it receives (and hence which SIBs the SI message contains), but it is also possible to identify the SIBs in an SI message by parsing the SI message. As previously noted, to indicate that a PDSCH transmission contains an SI message, the PDCCH scheduling DCI (which allocates the PDSCH transmission resources) is scrambled with the SI-RNTI.

As noted above, due to constraints of unlicensed channel operation, SI transmission may be interrupted if the gNB fails LBT (listen-before-talk) protocols before the scheduled SI transmission. In NR, notifications of coming SI updates are carried via a short message included in the downlink control information (DCI) on the PDCCH. Due to such potential LBT failures in unlicensed spectrum, it is not guaranteed that a gNB will deliver paging messages in all paging occasions (POs) of the paging DRX cycle during one SI modification period. When this situation occurs, a UE may not be informed of the coming SI update.

Additionally, although SI transmission has been addressed in Release 15 NG-RAN, due to some regulatory aspects of operation in unlicensed bands, changes are necessary in order for the user equipment (UE) to receive SI without interruption and significant delay.

Hence, with the foregoing as a backdrop, various exemplary embodiments of the improved methodologies for SI management and utilization of the present disclosure are now described in detail. These methodologies advantageously overcome the foregoing deficiencies associated with, inter alia, unlicensed NR operation, and further provide enhanced flexibility and different possible configurations that may be employed by wireless network operators and equipment manufacturers depending on the particular application(s) within which they are used.

Figure 3:
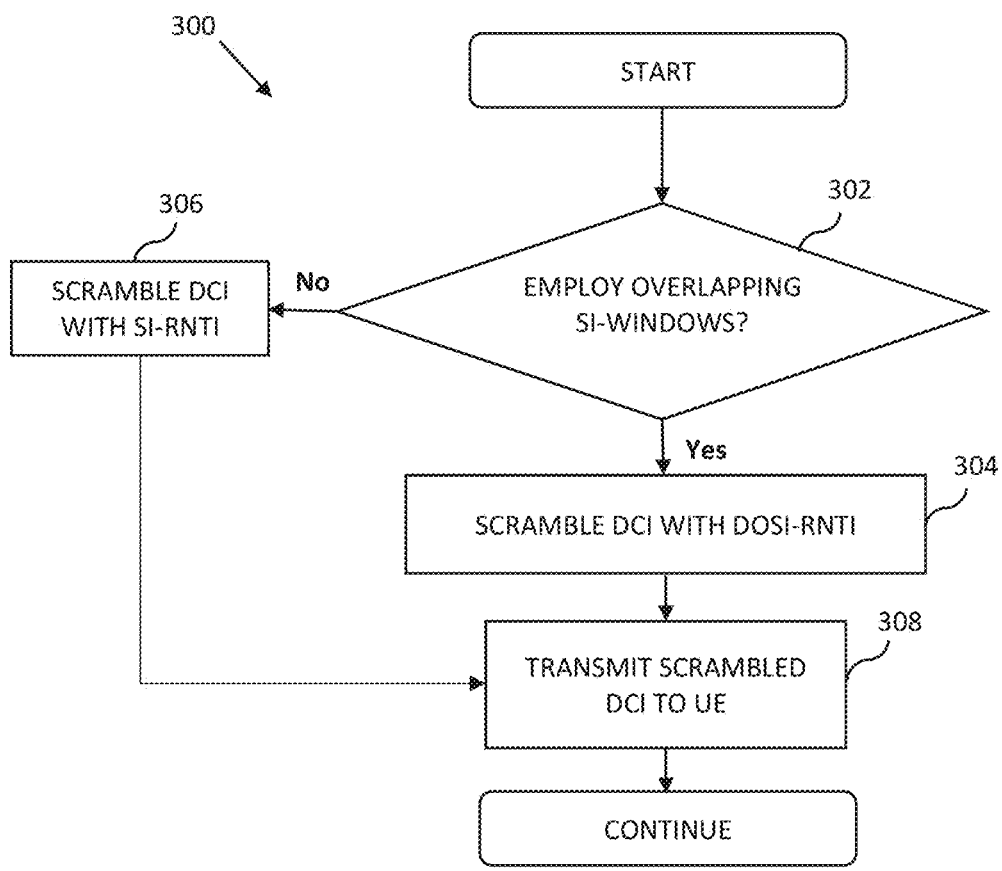
FIG. 3 is logical flow diagrams of an exemplary method for managing transmission of multiple SI-messages with overlapping SI-windows, according to the present disclosure.
Figure 4:
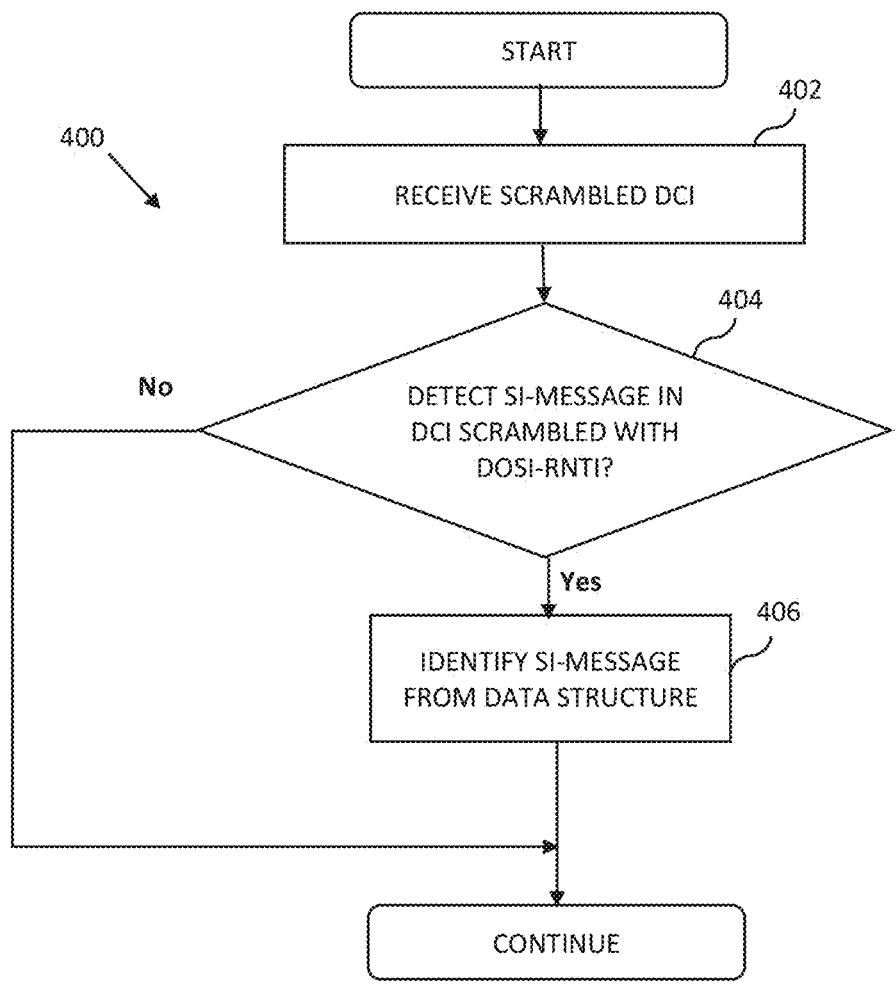
FIG. 4 is a logical flow diagram illustrating one embodiment of a method used by a UE in processing SI-messages according to the disclosure.
Figure 5:
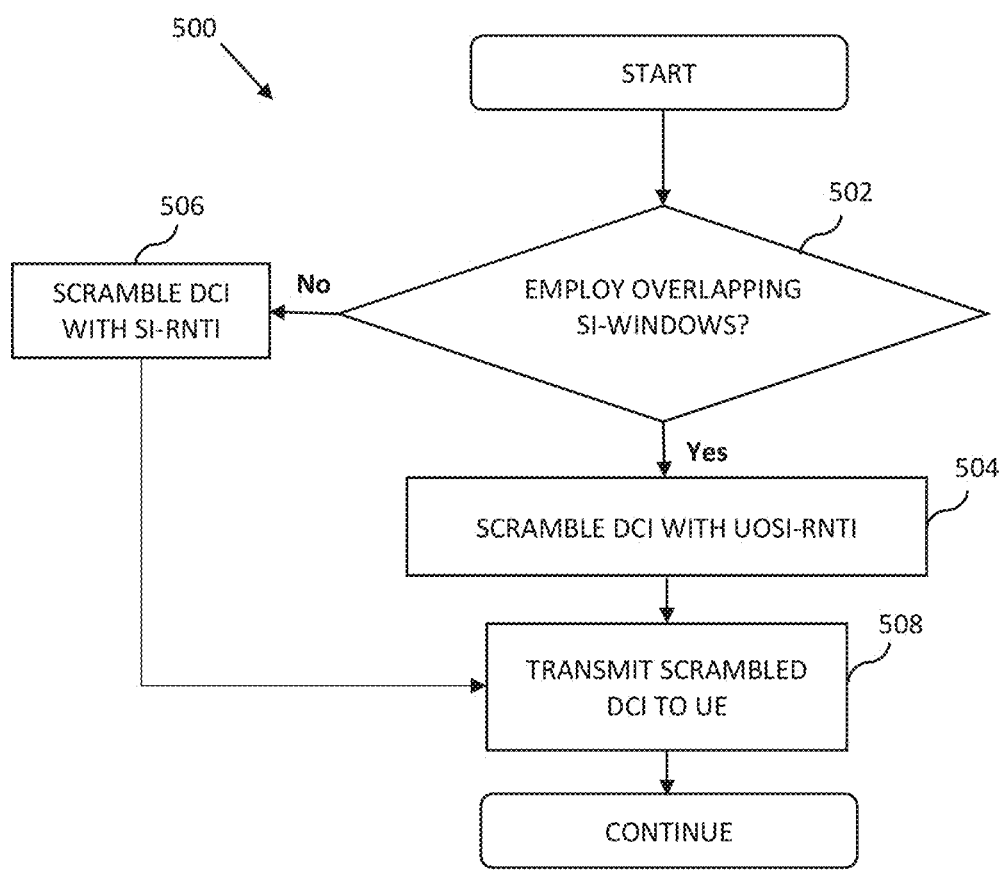
FIG. 5 is a logical flow diagram of another exemplary method for managing transmission of SI-messages using overlapping SI-windows, according to the present disclosure.

Specifically, FIGS. 3-5 illustrate various exemplary embodiments for managing transmission of multiple SI-messages with overlapping SI-windows, with no soft-combining support (when the SI-message is transmitted outside the periodicity duration).

Figure 6:
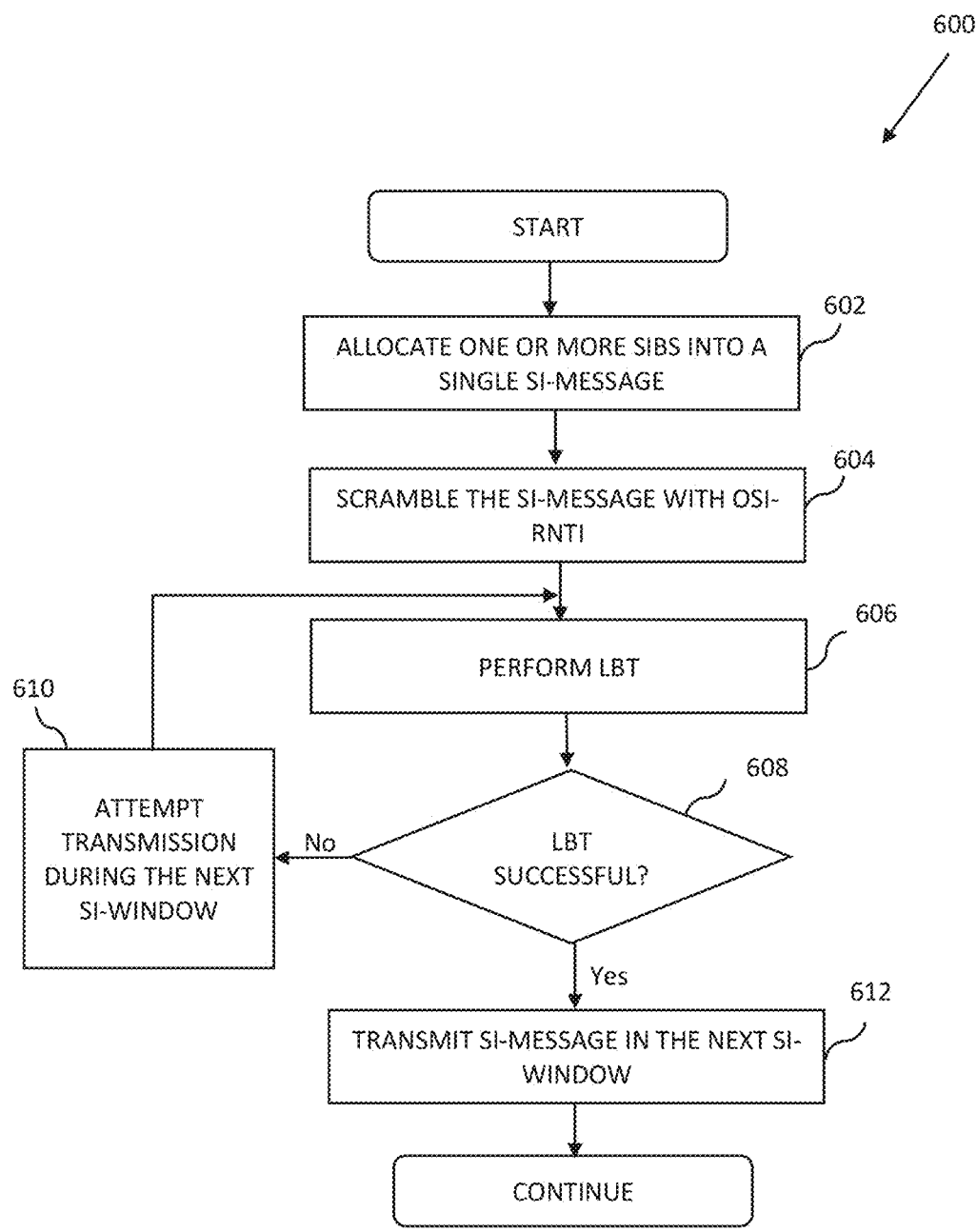
FIG. 6 is a logical flow diagram of an exemplary method for managing transmission of multiple SI-messages with overlapping SI-windows with soft-combining support, according to the present disclosure.
Figure 7:
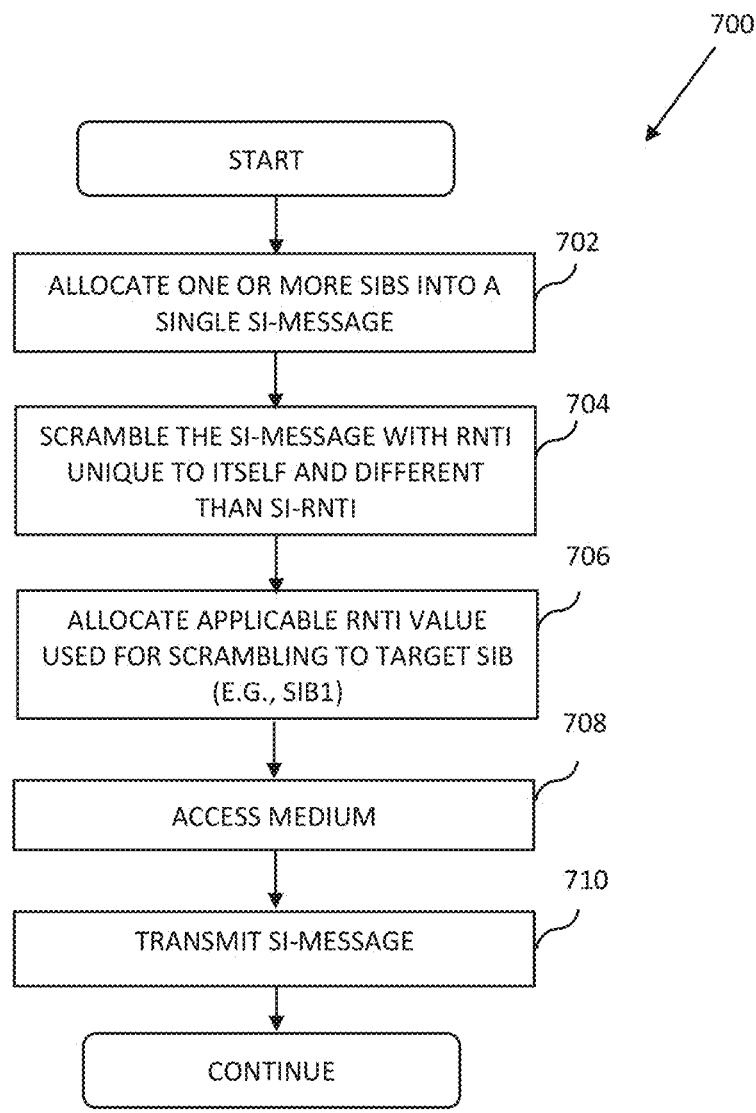
FIG. 7 is a logical flow diagram of another exemplary method for managing transmission of SI-messages using overlapping SI-windows, including RNTI signaling via one or more SIBs.

FIGS. 6-7 illustrate various exemplary embodiments for managing transmission of multiple SI-messages with overlapping SI-windows, with soft-combining support.

Figure 8:
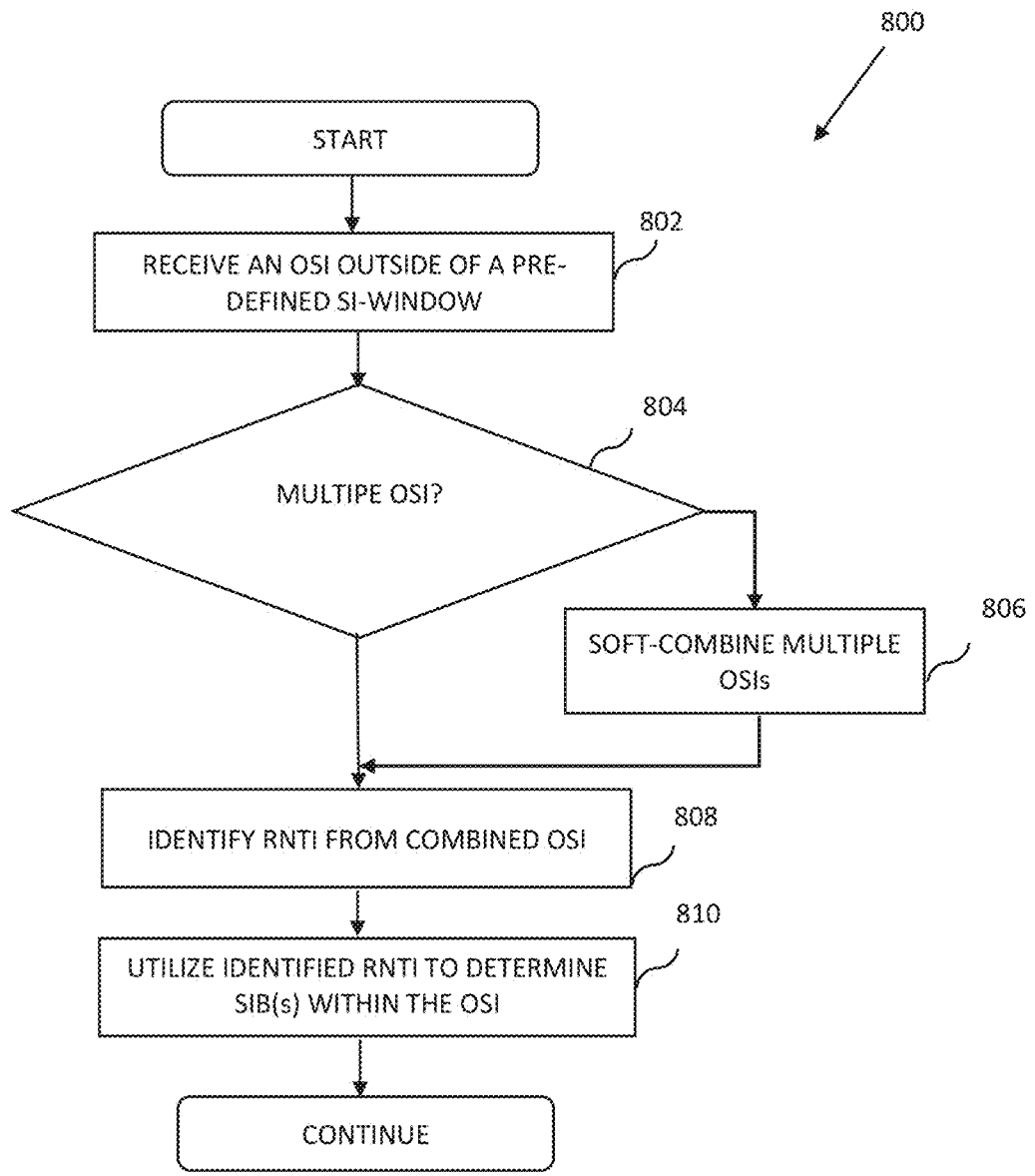
FIG. 8 is a logical flow diagram of an exemplary method for managing aperiodic OSI transmission, according to the present disclosure.

Lastly, FIG. 8 illustrates one exemplary embodiment for managing aperiodic OSI transmission according to the present disclosure.

1. Transmission of Multiple SI-Messages with Overlapping SI-Windows, with No Soft-Combining Support Referring now to FIGS. 3 and 4, one exemplary embodiment of the methodology 300 of managing transmission of multiple SI-messages with overlapping SI-windows, with no soft-combining support (e.g., based on transmission of the SI-message outside the periodicity duration) is shown and described. Specifically, in the exemplary embodiments of FIGS. 3 and 4, one or more SI-messages are scrambled with an RNTI different than SI-RNTI.

Method 300 of FIG. 3 starts with step 302 of determining whether to employ overlapping SI-windows. For example, in some variants, the gNB may decide to employ overlapping SI-window(s) (only) when NR-U access is being employed, and/or when the unlicensed carrier involved is lightly loaded (e.g., an available bandwidth of an unlicensed carrier utilized in servicing the UE meets or exceeds a pre-defined threshold). Moreover, since overlapping SI-Windows helps a UE to acquire multiple SIBs over a short duration of time, which is more efficient for the UE, the determination to use (or not use) overlapping windows may be at least partly predicated on electrical power (e.g., battery) considerations or other resource considerations of the UE; e.g., to conserve electrical power, reduce processing overhead (where applicable), etc.

Per step 304, based at least on a determination to employ overlapping SI-window(s), the gNB will scramble the DCI with e.g., a "DOSI-RNTI," which is an abbreviation for Distinguishing Overlapping SI-RNTI. Specifically, in various embodiments, the CRC of the DCI frames carrying SI messages with overlapping SI-windows are scrambled with an RNTI that is different to the SI-RNTI.

Alternatively, per step 306, based at least on a determination to employ non-overlapping SI-window(s), the gNB will scramble the DCI with SI-RNTI. Then, per step 608, the scrambled DCI (i.e., the DCI scrambled via either DOSI-RNTI or SI-RNTI) is transmitted to the UE.

As a brief aside, the differential utilization the DOSI-RNTI and the SI-RNTI identifies employing non-overlapping SI-windows (existing NR solution) to that of overlapping SI-windows (as introduced by the present disclosure). For example, per current NR specifications, SI-RNTI takes the unique hexadecimal value of "FFFF" per 3GPP TS 38.321: "NR: Medium Access Control (MAC) protocol specification" Clause 7.1 Table 7.1-1 (reproduced as Table 4 below):

TABLE 4

| Value (hexa-decimal) | RNTI |
| --- | --- |
| 0000 | N/A |
| 0001-FFEF | RA-RNTI, Temporary C-RNTI, C-RNTI, MCS-C-RNTI, CS-RNTI, TPC-PUCCH-RNTI, TPC-PUSCH-RNTI, TPC-SRS-RNTI, INT-RNTI, SFI-RNTI, and SP-CSI-RNTI |
| FFF0-FFFD | Reserved |
| FFFE | P-RNTI |
| FFFF | SI-RNTI |

The RNTI range of 0001-FFEF offers 65,518 unique values. With respect to the DOSI-RNTI, values other than "FFFF" are utilized, thereby providing additional options. For example, in some variants, DOSI-RNTI may use a value from the range marked "Reserved" in the above Table 4; e.g., FFF0 or FFFD, or any value in between. In other variants, DOSI-RNTI may use a value from the variable range "0001-FFEF"; e.g., FFEF. It is noted, however, that utilizing a value from the variable range "0001-FFEF" will introduce a non-backward compatible change.

The foregoing embodiment of the present disclosure advantageously reduces the processing overhead, especially at the UE side whereby the DCI is de-scrambled with CRC value, because the decoding choices for receiving this SI-message include only two RNTIs: (i) SI-RNTI and (ii) DOSI-RNTI.

Referring now to FIG. 4, a continuation of methodology 300 is shown and described, with the steps being performed at least in substantial part at the UE as opposed to the network-side as in FIG. 3 discussed above.

Specifically, per step 402 of the method 400, a UE receives the scrambled DCI from the gNB.

Per step 404, the UE may detect an SI-message scrambled with DOSI-RNTI. Based on detecting an SI-message scrambled with DOSI-RNTI, the UE proceeds to identify the SI-message from one or more data structures per step 406.

In some exemplary variants, the UE may identify the SIB(s) included in the SI-message. For example, the data structure(s) may include the ASN.1 CHOICE structure indicating the SIB(s) contained in this SI-message. The ASN.1 CHOICE structure is provided in Clause 6.3.2 of 3GPP TS 38.331: "NR; Radio Resource Control (RRC); Protocol specification," incorporated by reference in its entirety herein, and reproduced as Appendix A hereto.

Figure 4A:
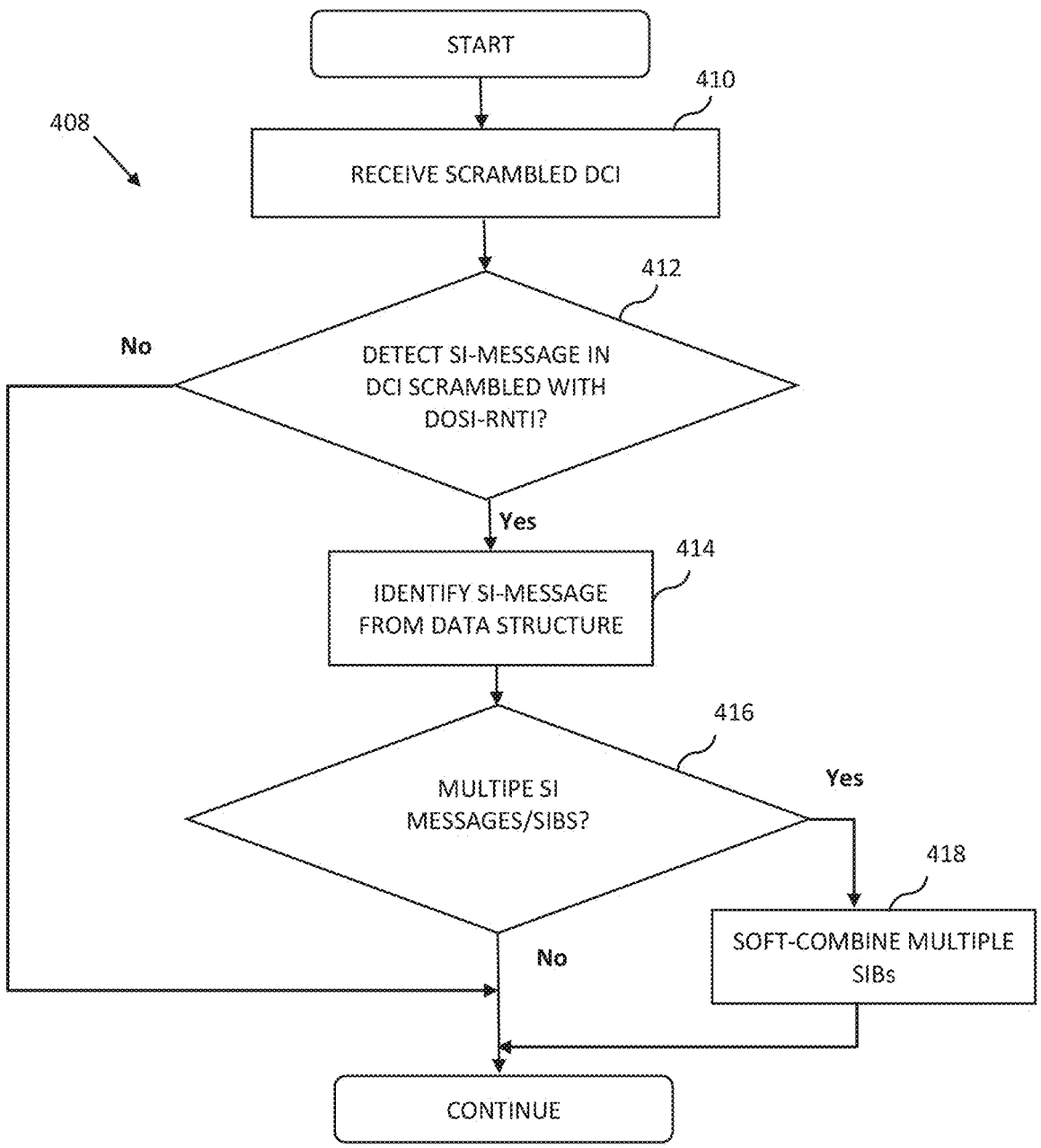
FIG. 4A is logical flow diagrams of one variant of the method of FIG. 4, wherein soft-combining is also utilized.

FIG. 4A illustrates a variant of the method of FIG. 4, with optional soft-combining included.

Specifically, per step 410, a UE receives the scrambled DCI from the gNB.

Per step 412, the UE may detect an SI-message scrambled with DOSI-RNTI. Based on detecting an SI-message scrambled with DOSI-RNTI, the UE proceeds to identify the SI-message from one or more data structures per step 414.

Again, in some exemplary variants, the UE may identify the SIB(s) included in the SI-message. For example, the data structure(s) may include the ASN.1 CHOICE structure indicating the SIB(s) contained in this SI-message. The ASN.1 CHOICE structure is provided in Clause 6.3.2 of 3GPP TS 38.331: "NR; Radio Resource Control (RRC); Protocol specification," incorporated by reference in its entirety herein, and reproduced as Appendix A hereto.

Additionally, per steps 416 and 418, the UE may detect and optionally soft-combine multiple SIBs within the same SI-message. However, it is noted that soft-combining multiple SIBs within the same SI-message generally only works if the SI-message is transmitted for at least the periodicity duration of each SIB included therein. Accordingly, further modifications to the system are required in order to soft-combine multiple SIBs within the same SI-message when the SI-message is transmitted outside the periodicity duration. Exemplary implementations of such modifications are provided herein (see FIGS. 5-6A and the supporting disclosure corresponding thereto provided below).

Referring now to FIG. 5, one exemplary embodiment of the methodology 500 of managing transmission of multiple SI-messages with overlapping SI-windows, with no soft-combining support (e.g., based on transmission of the SI-message outside the periodicity duration) is shown and described. Specifically, in the embodiment of FIG. 5, one or more SI-messages are scrambled with a single SIB scrambled with own unique RNTI is shown and described. That is, to facilitate transmission of SI messages without extending SI windows, each SI-message includes only a single SIB, which is transmitted with the same overlapping SI-window and is scrambled by its own RNTI which is different to SI-RNTI.

Method 500 of FIG. 5 starts with step 502 of determining whether to employ one or more overlapping SI-windows. For example, in some variants, logic within the gNB may decide to employ overlapping SI-window(s) when NR-U access is being employed, and/or when the unlicensed carrier involved is lightly loaded (e.g., an available bandwidth of an unlicensed carrier utilized in servicing the UE meets or exceeds a pre-defined threshold). Yet other conditions for use of the overlapping window paradigm will be appreciated by those of ordinary skill given the present disclosure.

Per step 504, based at least on a determination to employ overlapping SI-window(s), the gNB will scramble the DCI with a "UOSI-RNTI," which is an abbreviation for Unique Overlapping SI-RNTI. Alternatively, per step 506, based at least on a determination to employ non-overlapping SI-window(s), the gNB will scramble the DCI with SI-RNTI.

Then, per step 508, the scrambled DCI (i.e., the DCI scrambled via either UOSI-RNTI or SI-RNTI) is transmitted to the UE.

The difference between the methodologies of FIGS. 3-4A and that of FIG. 5 is that in the methodology 500 of FIG. 5, each SI-message contains only a single SIB. At the time of filing of this disclosure, only eight (8) SIBs are part of NR OSI; therefore, one aspect of the present disclosure enables reservation of a prescribed number such as eight (8) new RNTIs, referred to as UOSI-RNTI (Unique Overlapping SI-RNTI).

For example, in some variants, the UOSI-RNTI range could use values from the lower part of the variable range "0001-FFEF"; e.g., 0001-0008. Other variations such as selecting reserved UOSI-RNTI from the upper part of variable range "0001-FFEF", or within a prescribed window between lower and upper bounds, are also possible. It is noted that selecting reserved UOSI-RNTI from the upper part of variable range "0001-FFEF" will introduce a non-backward compatible change. In such variants, Table 7.1-1 of 3GPP TS 38.321: "NR: Medium Access Control (MAC) protocol specification" Clause 7.1 (see Table 4 above) would be modified according to one embodiment of the present disclosure as shown in Table 5 below:

TABLE 5

| Value (hexa-decimal) | RNTI |
|---|---|
| 0000 | N/A |
| 0001-0008 | UOSI-RNTI |
| 0009-FFEF | RA-RNTI, Temporary C-RNTI, C-RNTI, MCS-C-RNTI, CS-RNTI, TPC-PUCCH-RNTI, TPC-PUSCH-RNTI, TPC-SRS-RNTI, INT-RNTI, SFI-RNTI, and SP-CSI-RNTI |
| FFF0-FFFD | Reserved |
| FFFE | P-RNTI |
| FFFF | SI-RNTI |

In other variants, the UOSI-RNTI range may use values from the reserved fields "FFF0-FFFD" (a total of 13 available values). It is noted that utilizing values from the reserved fields "FFF0-FFFD" will not introduce backward compatibility issues. However, in the exemplary configuration, since the Reserved range contains 13 spare values, this solution requires that the number of NR SIBs remain under 13. In such variants, Table 7.1-1 of 3GPP TS 38.321: "NR: Medium Access Control (MAC) protocol specification" Clause 7.1 would be modified according to one embodiment of the present disclosure as shown in Table 6 below:

TABLE 6

| Value (hexa-decimal) | RNTI |
|---|---|
| 0000 | N/A |
| 0009-FFEF | RA-RNTI, Temporary C-RNTI, C-RNTI, MCS-C-RNTI, CS-RNTI, TPC-PUCCH-RNTI, TPC-PUSCH-RNTI, TPC-SRS-RNTI, INT-RNTI, SFI-RNTI, and SP-CSI-RNTI |
| FFF0-FFF8 | UOSI-RNTI |
| FFF8-FFFD | Reserved |
| FFFE | P-RNTI |
| FFFF | SI-RNTI |

2. Transmission of Multiple SI-Messages with Overlapping SI-Windows, and with Soft-Combining Support Referring now to FIG. 6, one exemplary embodiment of a methodology 600 for managing SI-message transmissions, including scrambling one or more SI-messages with an RNTI that is specific to SIBs within the SI-message, is shown and described.

In this embodiment, to facilitate transmission of SI messages without extending SI windows, multiple SIBs are allocated to the same SI message, and the multiple SIBs are scrambled by a unique SI-RNTI that identifies the set of SIBs included in the SI message. Additionally, to enable soft-combining, the same SI message is repeated across the SI-window. With this embodiment, the SI-windows duration need not be altered compared to the current NR baseline described supra.

Per step 602, a gNB may allocate one or more SIBs into a single SI-message. In one exemplary implementation, a gNB 414 may aggregate all the SIBs (SIB1-SIB9) in one SI message.

Additionally, the present disclosure provides two exemplary approaches of allocating SIBs into an SI-message in a limited fashion, each of which are described in further detail below. In one such approach, the gNB may allocate a previously un-transmitted (e.g., due to not being able to acquire the unlicensed medium) SIB(s) with a SIB whose periodicity falls within this SI-window, into one SI message. The foregoing approach would typically be employed for instance when the LBT fails during a particular SI-window (per step 606), and therefore the SIB corresponding to that SI-window is not transmitted.

In another such approach, the SIBs may be categorized together based on, e.g., the type of information they carry (or other metrics such as priority or latency requirements), and included in a single SI-message based on such categorization.

It is also noted that the foregoing approaches are not mutually exclusive (i.e., SIBs can be allocated into a single SI-message utilizing both approaches, as well as using only one approach). Moreover, the foregoing approaches are exemplary in nature; other methods of allocating SIBs into a single message known in the arts can or recognized by those of ordinary skill given this disclosure may be applied.

Per step 604, the transmitter (e.g., gNB in this example) scrambles the SI-message with a RNTI that is uniquely associated with the set of SIBs within the SI-message. This RNTI (that is uniquely associated with the set of SIBs within the SI-message) is herein referred to as "OSI-RNTI," which is an abbreviation for Overlapping SI-RNTI.

Next, per step 606 of the method 600, an LBT process is performed, and based on a successful LBT per step 608, the SI-message is transmitted in the next SI-window per step 612. Listen-Before-Talk (LBT) (or "Listen Before Transmit") is a technique whereby for example a radio transmitter first finds a network or free radio channel on which it can operate before it starts a transmission. Various approaches to LBT processing may be used consistent with the present disclosure, as will be appreciated by those of ordinary skill.

If the LBT procedure is unsuccessful per step 608, the gNB attempts to transmit the SI-message during the next SI-window by again attempting LBT per step 606 at a subsequent time. This time may be determined by e.g., expiry of a timer, a count of a given parameter reaching a prescribed value, according to a randomized backoff and retry process, or other approach.

If the next LBT is successful, the SI-message is transmitted in the next window per step 612.

Figure 6A:
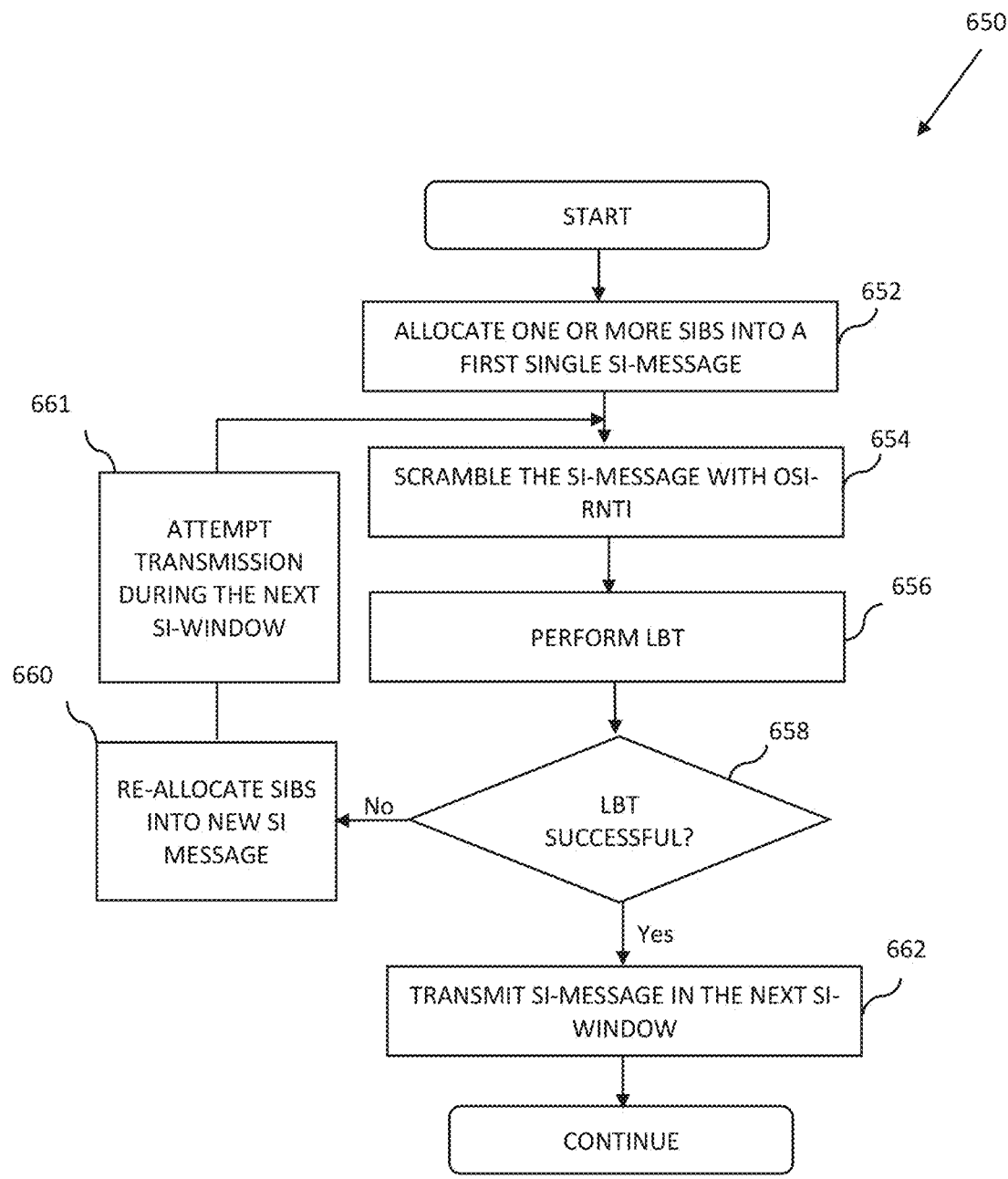
FIG. 6A is a logical flow diagram of another exemplary method for managing transmission of multiple SI-messages with overlapping SI-windows, according to the present disclosure.

FIG. 6A illustrates another embodiment of the method for managing SI-message transmissions, wherein SIB re-allocation is conducted during an LBT "failure" iteration.

Per step 652 of the method 650, a gNB allocates one or more SIBs into a single SI-message. In one exemplary implementation, a gNB may aggregate all the SIBs (SIB1-SIB9) in one SI message.

As a brief aside, the number of subsets of the set of all SIBs, i.e. {SIB2, . . . , SIB9} is extensive. Therefore, requiring a UE to verify the OSI-RNTI unique to each of the combinations may add to complexity and/or delay, especially at the UE side, where processing power may be more limited. Such verification may also undesirably consume electrical power such as UE battery charge.

Accordingly, in various embodiments of the present disclosure, logic is utilized wherein a limited number of subsets of the set of all SIBs are included in a single SI-message to reduce processing overhead at the UE side. Advantageously, these limited or reduced subsets may be statically or dynamically invoked as well, depending on application. Two exemplary approaches for reducing the number of SIB combinations that a gNB (or other network node, access point, etc.) would aggregate in a message are disclosed in the following.

As alluded to above, in one exemplary embodiment, the SIBs may be allocated to a single SI-message based on various relations to each other—i.e., the SIBs that carry more related information may be transmitted together in an SI-window. For example, in some variants, a gNB may form an SI message that includes all of the SIBs that carry information about cell re-selection (e.g., SIB2-SIB5, or a subset of these SIBs). A unique RNTI (OSI-RNTI) may be assigned to each of such messages—e.g., SI2345-RNTI for the message that consists of SIB2, SIB3, SIB4 and SIB5; SI345-RNTI for the message that consists of SIB3, SIB4 and SIB5; etc.

In another variant, SIBs that carry emergency information (such as SIB6, SIB7 and SIB8) may similarly be aggregated into one SI message.

In yet another variants SIB2 to SIB4 (which carry the re-selection information for NR cells) may be carried in a message (unlike SIB5 that has the information for E-UTRA cells).

In yet another variant, SIB3 and SIB4 carry re-selection information for NR intra- and inter-frequency neighbor cells, and therefore, they may be categorized together and put into one SI-message.

By implementing the foregoing logic such as each of the aforementioned variants, the number of combinations of subsets SIB2 to SIB5 that a gNB may send in an SI-window would be: S1={SIB3, SIB4}, S2={SIB2, SIB3, SIB4}, S3={SIB2, SIB3, SIB4, SIB5}.

In one implementation of the method 600, a unique RNTI (OSI-RNTI) is assigned to each of these subsets (i.e., S1, S2, and S3) per step 612. A UE attempting to decode an SI message within an SI-window (that is configured to be the SI-window of SIB2, SIB3, SIB4 or SIB5) would first try the SI-RNTI=0xFFFF (or a unique SI-RNTI for the SI-window), followed by the above-mentioned OSI-RNTIs.

In a similar approach for SIB6 to SIB9, the following combinations may be preferred to be aggregated in an SI message: {SIB6, SIB7}, {SIB6, SIB7, SIB8}, {SIB6, SIB7, SIB8, SIB9}.

Additionally, in another variant, a gNB may put together all the SIBs in one SI message; hence, the last unique RNTI that a UE may try could be the RNTI associated with the set {SIB2, SIB3, . . . , SIB9}.

From the perspective of the UE, in an exemplary SI-window that is configured for {SIB2, . . . , SIB5}, the UE uses SI-RNTI=FFFF to attempt to detect the intended SIB; if not successful, the UE uses RNTI=FFF0-FFF2 assigned respectively to {SIB3, SIB4}, {SIB2, SIB3, SIB4}, and {SIB2, SIB3, SIB4, SIB5}. In an SI-window that is configured for {SIB6, . . . , SIB9}, a UE uses SI-RNTI=FFFF to detect the intended SIB; and if not successful (per step 606), the UE uses RNTI=FFF3-FFF5 assigned respectively to {SIB6, SIB7}, {SIB6, SIB7, SIB8}, {SIB6, SIB7, SIB8, SIB9}. Accordingly, the UE in this scenario tries four RNTIs. Alternatively, RNTI=FFF0 could be used for {SIB3, SIB4} and {SIB6, SIB7}; and a UE, depending on the SI-window, would use RNTI=FFF0 to detect the intended SI message.

Table 7 below shows the assignment of RNTI=FFF0-FFF5 to the above-mentioned sets:

TABLE 7

| Value (hexa-decimal) | RNTI |
|---|---|
| 0000 | N/A |
| 0001-FFEF | RA-RNTI, Temporary C-RNTI, C-RNTI, MCS-C-RNTI, CS-RNTI, TPC-PUCCH-RNTI, TPC-PUSCH-RNTI, TPC-SRS-RNTI, INT-RNTI, SFI-RNTI, and SP-CSI-RNTI |
| FFF0-FFF5 | OSI0-RNTI, OSI1-RNTI, OSI2-RNTI, OSI3-RNTI, OSI4-RNTI, OSI5-RNTI |
| FFF6-FFFD | Reserved |
| FFFE | P-RNTI |
| FFFF | SI-RNTI | wherein:
OSOSI0={SIB3, SIB4};
OSI1={SIB2, SIB3, SIB4};
OSI2={SIB2, SIB3, SIB4, SIB5};
OSI3={SIB6, SIB7};
OSI4={SIB6, SIB7, SIB8}; and
OSI5={SIB6, SIB7, SIB8, SIB9}.

In another implementation, a single RNTI may be assigned to two different OSI sets, and a UE would use the RNTI to detect an OSI set depending on the SI-window. For instance, in one configuration, RNTI=FFF0 is used to detect OSI0 or OSI3 where, if RNTI=FFF0 is used during SI-window configured for SIB3 or SIB4, then the detected SI-message is SIB3, SIB4 or a message including both (i.e., OSI0). If RNTI=FFF0 is used during SI-window configured for SIB6 or SIB7, then the detected SI-message is SIB6, SIB7 or a message including both (i.e., OSI3). Hence, Table 8 below, RNTI=FFF0 is referred to OSI03-RNTI.

TABLE 8

| Value (hexa-decimal) | RNTI |
|---|---|
| 0000 | N/A |
| 0001-FFEF | RA-RNTI, Temporary C-RNTI, C-RNTI, MCS-C-RNTI, CS-RNTI, TPC-PUCCH-RNTI, TPC-PUSCH-RNTI, TPC-SRS-RNTI, INT-RNTI, SFI-RNTI, and SP-CSI-RNTI |
| FFF0-FFF2 | OSI03-RNTI, OSI14-RNTI, OSI24-RNTI |
| FFF3-FFFD | Reserved |
| FFFE | P-RNTI |
| FFFF | SI-RNTI |

Returning again to FIG. 6A, per step 654, the transmitter (e.g., gNB in this example) scrambles the SI-message with a RNTI that is uniquely associated with the set of SIBs within the SI-message; i.e., "OSI-RNTI."

Next, per step 656, an LBT process is performed, and based on a successful LBT per step 658, the SI-message is transmitted in the next SI-window per step 662.

Conversely, if the LBT procedure is unsuccessful per step 658, the gNB (i) re-allocates SIBs within the SI-message per step 660 and (ii) attempts to transmit the SI-message during the next SI-window per step 661. Specifically, as referenced above, in some variants, the combinations of SIBs that are transmitted in an SI-window depend on the SIB that is configured for that SI-window and all previous SI-windows.

For example, consider the scenario where an SI-window is configured for transmission of SIB2, followed by an SI-window configured for transmission of SIB3, followed by an SI-window configured for SIB4, and so forth. If the LBT process fails (per step 658) during the SI-window configured for transmission of SIB2, the gNB attempts to transmit during the next SI-window (i.e., the window configured for SIB3) per steps 600 and 661. If the LBT process is successful during the SI-window of SIB3 (per step 658), then the gNB transmits (per step 662) an SI message that includes both SIB2 and SIB3 (allocated in the SI-messages per step 602), and would use the unique RNTI for the subset {SIB2, SIB3}.

However, if the second LBT in the scenarios above fails during the SI-window of SIB3 (per step 658), then the gNB attempts to transmit during the SI-window configured for SIB4. If the LBT process is successful during the SI-window configured for SIB4, then the gNB transmits an SI message that includes SIB2, SIB3 and SIB4 together (allocated thereto per step 660) and would use the unique RNTI for the subset {SIB2, SIB3, SIB4}. As can be appreciated, this logic can be extended to additional subsequent SI-windows and failures of the LBT process, the foregoing being one illustration of the generalized process.

Considering the above scenario, one UE behavior might be to attempt a few unique RNTIs (OSI-RNTIs) which depend of the current SI-window, and a few past SI-windows.

It will further be recognized that the number of past SI-windows from which SIBs may be included in the SI-message is variable. Considering the possibility of successive LBT failures as alluded to above, it may in some implementations suffice to consider up to a prescribed number (e.g., two or three) past SI-windows. Hence, a UE would try three or four various RNTIs.

From the UE perspective, a UE would use SI-RNTI=FFFF to detect the SIB intended for the configured SI window. If not successful, the UE uses RNTI=FFF0 to detect the SI message consisting of the intended SIB and the SIB intended for the previous SI-window. If not successful again, the UE uses RNTI=FFF1 to detect the SI message consisting of the intended SIB and the SIBs intended for the two previous SI-window.

Table 9 below shows an exemplary embodiment of an assignment of RNTI=FFF0 for detection of an SI-message including an intended SIB (with respect to the SI-window) and the SIB intended for the previous SI-window. RNTI=FFF1 is used for detection of an SI-message including an intended SIB (with respect to the SI-window) and the SIB intended for the previous SI-window and the SIB intended for the prior SI-window.

TABLE 9

| Value (hexa-decimal) | RNTI |
| --- | --- |
| 0000 | N/A |
| 0001-FFEF | RA-RNTI, Temporary C-RNTI, C-RNTI, MCS-C-RNTI, CS-RNTI, TPC-PUCCH-RNTI, TPC-PUSCH-RNTI, TPC-SRS-RNTI, INT-RNTI, SFI-RNTI, and SP-CSI-RNTI |
| FFF0 | OSI0-RNTI |
| FFF1 | OSI1-RNTI |
| FFF2-FFFD | Reserved |
| FFFE | P-RNTI |
| FFFF | SI-RNTI |

In one exemplary embodiment, the UE is configured such that its general behavior upon receiving such SI message is to try multiple OSI-RNTIs, in order to find out which OSI-RNTI validates; this equivalently identifies what set of SIBs is within the received SI-message. Since the UE is a priori unaware of which SIBs are included in a received SI message, it is therefore also unaware of the correct value of OSI-RNTI for decoding the SI message. Therefore, the exemplary embodiments corresponding to method 600 of FIG. 6 (including, inter alia, scrambling one or more SI-messages with RNTI that is specific to SIBs within the SI-message), when used by the transmitting gNB may in some cases require "brute force" (check-sum) computation on the received DCI frame scrambled with OSI-RNTI.

For example, to decode a received SI-message utilizing a brute force computation, the UE will in one scenario try various permutations of OSI-RNTI (e.g., SI1-RNTI, SI12-RNTI, SI345-RNTI etc.). However, it is noted that such computation does not require additional FEC decoding or blind decoding; rather, after decoding the PDCCH payload for CRC or error-detection check, the UE may be configured to try a prescribed or ordered set of SI-RNTIs to determine which SI-RNTI validates.

Similarly, during soft-combining of multiple received SI messages within the same SI window (where utilized), the UE may try multiple OSI-RNTIs on the soft-combined message to identify the correct OSI-RNTI. If none of these tries are successful, the UE may then wait for the next SI-message within the same SI window to attempt decode, and if unsuccessful the next message, and so on.

It is noted that in the exemplary embodiment, the soft-combining process refers to the process of combining the soft-bits (after FEC decoding) of a PDSCH (or PDCCH) with the soft-bits obtained from another PDSCH (or PDCCH). It will be appreciated by those of ordinary skill given this disclosure, however, that other approaches to soft-combining may be used, the foregoing combination of post-FEC soft-bits of a given channel being merely exemplary.

Figure 6B:
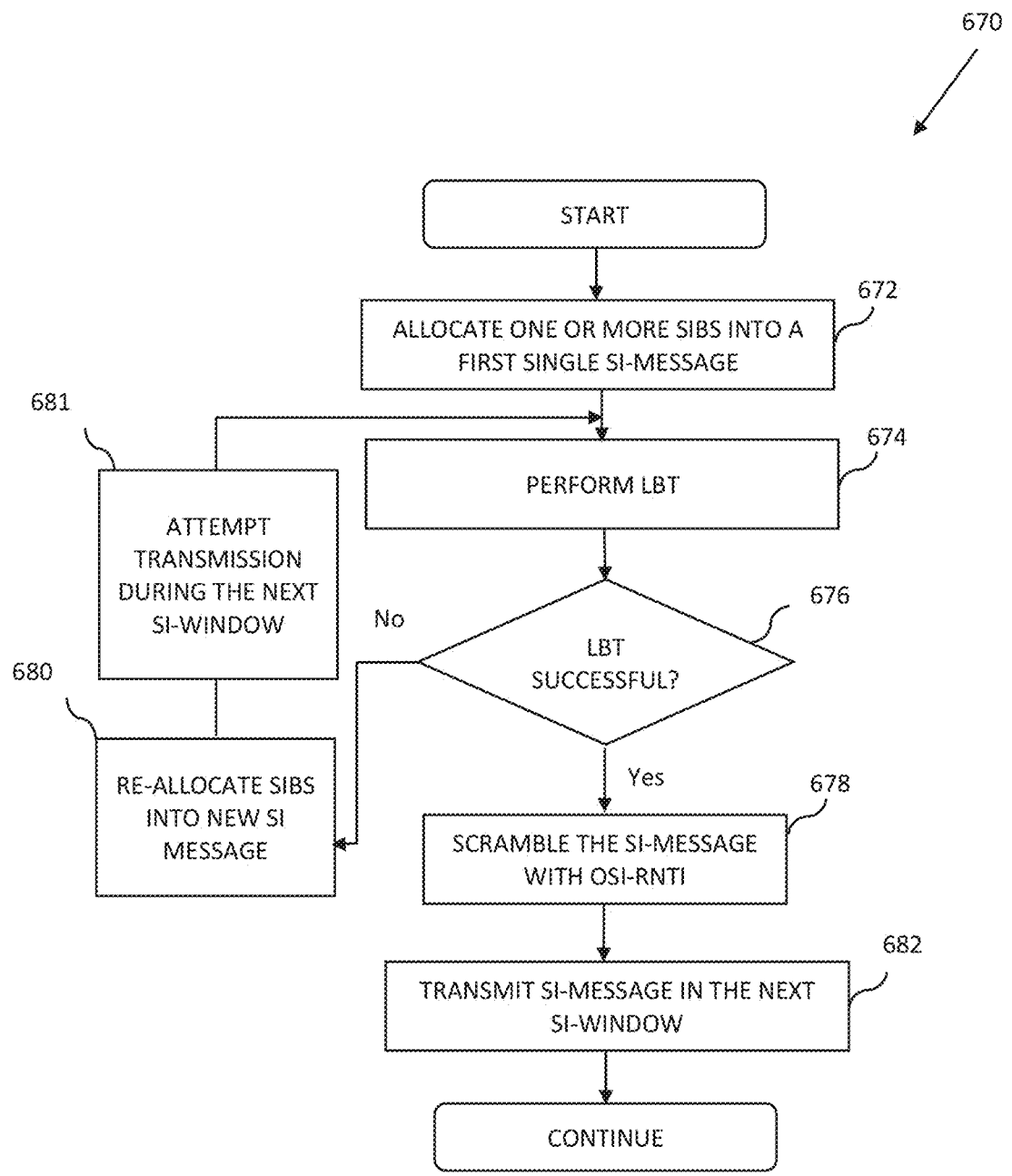
FIG. 6B is a logical flow diagram of yet another exemplary method for managing transmission of multiple SI-messages with overlapping SI-windows, according to the present disclosure.

FIG. 6B illustrates yet another embodiment of the method for managing SI-message transmissions, wherein SIB re-allocation is conducted during an LBT "failure" iteration. In this embodiment, scrambling is applied contingent on whether the LBT process is successful or not.

Per step 672 of the method 670, a gNB allocates one or more SIBs into a single SI-message. In one exemplary implementation, a gNB may aggregate all the SIBs (SIB1-SIB9) in one SI message.

Next, per step 674, an LBT process is performed, and based on a successful LBT per step 676, the transmitter (e.g., gNB in this example) per step 678 scrambles the SI-message with a RNTI that is uniquely associated with the set of SIBs within the SI-message; i.e., "OSI-RNTI." The scrambled SI-message is then transmitted in the next SI-window per step 682.

Conversely, if the LBT procedure is unsuccessful per step 676, the gNB (i) re-allocates SIBs within the SI-message per step 680 and (ii) attempts to transmit the SI-message during the next SI-window per step 681. Specifically, as referenced above, in some variants, the combinations of SIBs that are transmitted in an SI-window depend on the SIB that is configured for that SI-window and all previous SI-windows.

Referring now to FIG. 7, one exemplary embodiment of a methodology 700 for scrambling one or more SI-messages with RNTI that is unique to itself (and different with respect to the SI-RNTI) is shown and described.

As shown in FIG. 7, per step 702, the gNB allocates one or more SIBs into a single SI-message. This allocation may be for example according to various rules or constructs previously described with respect to FIG. 6A, or according to another scheme.

Per step 704, the SI-message is scrambled with an RNTI which is both unique to itself and different than the SI-RNTI.

In this embodiment of the method 700, to help transmission of SI messages without extending SI windows, each SI-message transmitted with the same overlapping SI-window is scrambled by an RNTI unique to itself and different from the SI-RNTI.

Additionally, to convey the resulting RNTI value to be used for a given SI-message, the exemplary embodiment of the method 700 provides data indicative of the association of the unique RNTI to the SI-message in SIB1 per step 706.

In one implementation, 3GPP TS 38.331: "NR; Radio Resource Control (RRC); Protocol specification" Clause 6.3.2 is configured similar to the Clause 6.3.2 information provided above (Appendix A); however, it will be appreciated that other configurations of IE's (such as the SI-SchedulingInfo IE of Appendix A or others) may be used consistent with the present disclosure.

Once the RNTI data has been allocated to the SIB, then per step 708 of the method, the transmission medium is accessed (e.g., via one or more LBT processes as described above with respect to FIG. 6), and once the medium is accessed, the SI-message is transmitted to the UE per step 710.

3. Aperiodic OSI Transmission

Referring now to FIG. 8, one exemplary embodiment of a methodology 800 for receiving aperiodic OSI (Other SI) messages is shown and described. In this embodiment, the gNB schedules and transmits OSIs (e.g., SI messages including one or more SIBs) outside of a pre-defined SI window and without any specific periodicity, even if these OSIs are not indicated as on-request SIBs. Such an opportunistic OSI transmission may be bundled with, for example, a Discovery Reference Signal (DRS) transmission, a paging frame, or any DL data or control channel transmission.

As a brief aside, Discovery Reference Signals (DRS are transmitted to enable UEs to "discover" an active channel. For example, a UE can utilize the DRS to determine appropriate time and frequency compensation parameters for the channel.

The method 800 starts at step 802 with the UE receiving an OSI outside of a pre-defined SI window and without any specific periodicity. As mentioned above, besides one or more SIBs, the OSI may include, in various implementations, a Discovery Reference Signal (DRS) transmission, a paging frame, or any DL data or control channel transmission. In order to facilitate acquisition of such opportunistic OSIs by RRC_IDLE or RRC_INACTIVE UEs, various information can be included with the OSI transmission. For example, DRS transmissions, paging occasions (POs), or GC-PDCCH carrying channel occupancy time (COT) information can indicate if aperiodic SIBs are going to be transmitted in a later slot in the same COT.

Per step 804, the UE determines whether multiple OSI-messages are present, and optionally applies soft-combining of these SI messages per step 806. Such soft-combining can be performed when the UE can determine which SIB(s) are contained in the opportunistic SI message (such as via adopting an RNTI as described previously). Soft-combining may be performed for a SI message transmitted within a periodic SI window.

Next, per step 808, the UE identifies an RNTI. In one exemplary embodiment, the RNTI includes a unique SI-RNTI (as disclosed above in the supporting discussion corresponding to FIG. 7) that identifies the set of SIBs included in the OSI. In one exemplary embodiment, the identification includes the UE performing a brute force (check-sum) computation on the received DCI frame scrambled with OSI-RNTI. That is, to decode SI-message, the UE will need to try various permutations of OSI-RNTI e.g. SI1-RNTI, SI12-RNTI, SI345-RNTI, etc. However, such computation does not require additional FEC decoding or blind decoding; rather, after decoding the PDCCH payload for CRC or error-detection check, the UE in one configuration would try an ordered set of SI-RNTIs to find out which SI-RNTI checks.

Per step 810, the UE utilizes the identified RNTI to determine/identify the SIB(s) included in the OSI.

Per step 808, the UE may optionally soft-combine the SI-message with another SI-message. Soft-combining of these SI messages can be performed when the UE can determine which SIB(s) are contained in the opportunistic SI message, which can be achieved by adopting an RNTI. Soft-combining may then be performed for a SI message transmitted within a periodic SI window (see FIGS. 6 and 6A), as well as the same SI message transmitted opportunistically.

SI Change Notification

As described elsewhere herein, notifications of SI updates are carried via a short message. However, if the LBT process fails, a gNB cannot deliver paging messages to the target UE. Hence, in one embodiment of the methodologies of the present disclosure, such SI change notification may remain undelivered until the next paging occasion (PO).

In another embodiment, when an LBT failure prevents a gNB from delivering paging messages in a PO of the applicable paging discontinuous reception (DRX) cycle (during one SI modification period), the gNB may provide a Short Message, indicating an SI change, in the subsequent discovery reference signal (DRS) transmission (or several subsequent DRS transmissions). Such indication notifies UEs (e.g., those that might have not detected any paging in their calculated PO) of a SI change such that the UE(s) check for new SI.

As a brief aside, Discontinuous Reception (DRX) (also known as a paging cycle) is utilized by 3GPP UEs in RRC_IDLE state to reduce power consumption. The DRX cycle corresponds to how frequently a UE checks for paging messages. The default DRX cycle is broadcast within System Information Block 2 (SIB2). The range for paging cycle varies as 32, 64, 128 and up to 256 radio frames.

Additionally, a UE can propose its own DRX cycle length within the Attach Request and Tracking Area Update Request message. The range of allowed values is the same as those used in SIB2. If a UE proposes its own DRX cycle to be used, the shorter length (or minimum) of the two DRX cycles (i.e., the xNB proposed DRX cycle and the UE proposed DRX cycle) is used.

Hence, in one configuration, when detecting such a short message, the UE checks the next SI-window (or next several SI-windows, such as according to a prescribed parameter or UE proposed value), and decodes any corresponding SI-messages detected.

Base Station Apparatus—

Figure 9:
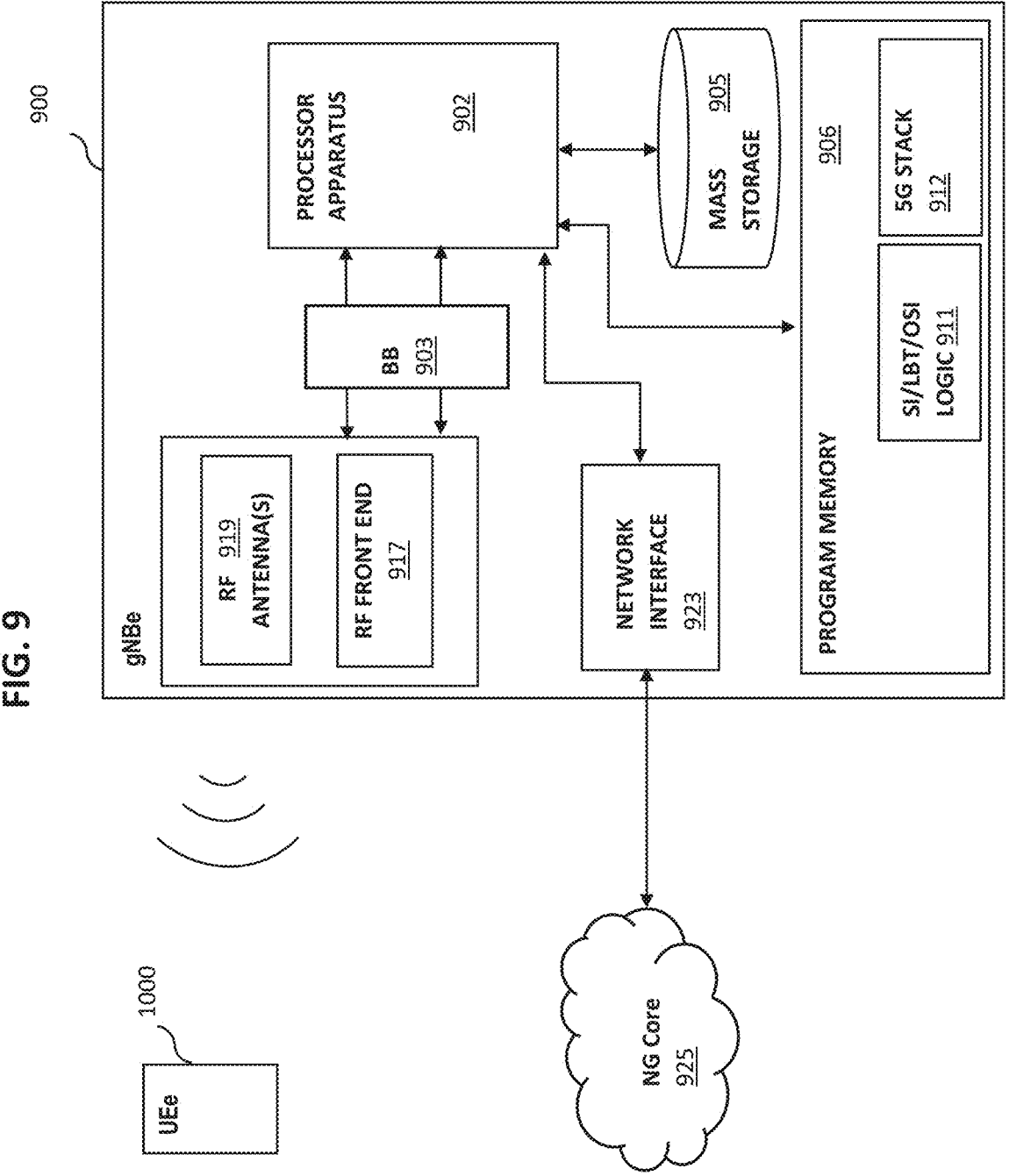
FIG. 9 is functional block diagram illustrating one embodiment of an enhanced wireless access node (e.g., 5G NR compliant enhanced gNB) according to the disclosure.

FIG. 9 illustrates a block diagram of an exemplary embodiment of an enhanced base station apparatus (e.g., 5G gNBe) 900, useful for operation in accordance with the present disclosure.

In one exemplary embodiment as shown, the base station 900 includes, inter alia, a processor apparatus or subsystem 902, a program memory module 906, a local mass storage device 905, and network interfaces 923 for communications with the relevant 5G-NR RAN or other entities such as an AMF and the enhanced UEe 1000 described subsequently herein.

In one embodiment, the processor apparatus 902 may include one or more of a digital signal processor, microprocessor, field-programmable gate array, GPU, or plurality of processing components mounted on one or more substrates. The processor apparatus 902 may also comprise an internal cache memory. In addition, the gNBe may include SI/LBT logic 910 in the program memory which is in communication with the processing subsystem (as well as a 5G stack 912 to implement other 5G NR related functions of the gNB). In one example, the SI/LBT logic maybe implemented as software or firmware stored on a storage device and executed on the processor 902.

The processing subsystem 902 is in communication with a program memory module or subsystem 906, where the latter may include memory which may comprise, e.g., SRAM, flash and/or SDRAM (e.g., GDDR5 or GDDR6) components. The memory module 906 may implement one or more of direct memory access (DMA) type hardware, so as to facilitate data accesses as is well known in the art. The memory module of the exemplary embodiment contains one or more computer-executable instructions that are executable by the processor apparatus 902. A mass storage device (e.g., HDD or SSD, or NAND/NOR flash or the like) 905 is also provided as shown.

The processor apparatus 902 is configured to execute at least one computer program stored in memory 906 (e.g., the logic of the SI/LBT module according to the methods of FIGS. 3-8, herein, in the form of software or firmware that implements the various functions). Other embodiments may implement such functionality within dedicated hardware, logic, and/or specialized co-processors (not shown).

In some embodiments, the logic 910 also utilizes memory 906 or other storage 905 configured to temporarily and/or locally hold a number of data relating to the various RNTI, SIBs, rules, policies, locations, bands, and other data for the various UEe 1000 (whether alone or in cooperation with another database) which it services under the NR standard(s). In other embodiments, application program interfaces (APIs) may also reside in the internal cache or other memory 1906. Such APIs may include common network protocols or programming languages configured to enable communication between with other network entities (e.g., via API "calls" to or from the NG Core or other entities, such as MSO based headend control entities or processes, such as to implement desired frequency spectrum plans or policy changes).

As noted, the gNBe 900 includes SI/LBT logic 1910 which is configured to support use the enhanced SI-message protocols, generation of unique RNTI, implementation of LBT protocols, and other rules including frequency spectrum usage.

User Apparatus—

Figure 10:
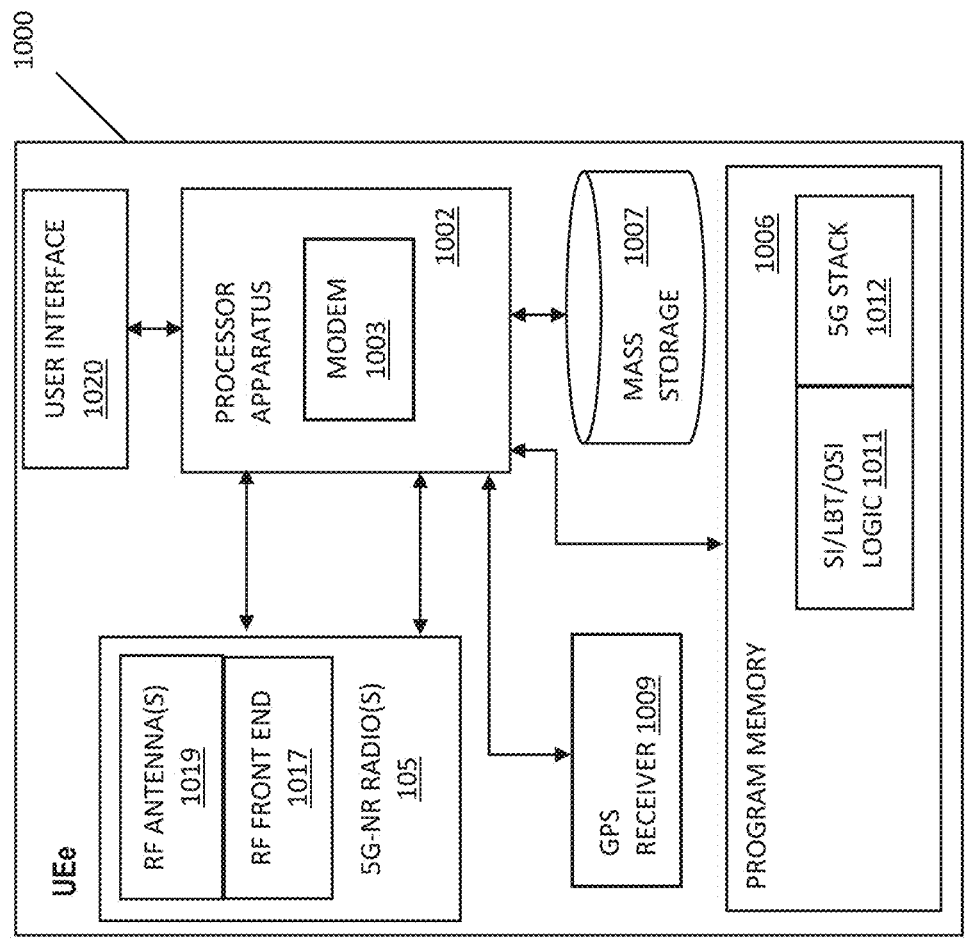
FIG. 10 is a functional block diagram illustrating one embodiment of a user device (e.g., enhanced UE or user equipment such as a mobile device) configured according to the disclosure.

FIG. 10 illustrates a block diagram of an exemplary embodiment of an enhanced user apparatus (e.g., 5G NR-enabled UE (UEe)) apparatus 1000, useful for operation in accordance with the present disclosure.

In one exemplary embodiment as shown, the UEe 1000 includes, inter alia, a processor apparatus or subsystem 1002, a program memory module 1006 which includes enhanced SI/LBT logic 1010, as well as a 5G NR stack 1012 (here each implemented as software or firmware operative to execute on the processor 1002), and wireless radio interface(s) 1005 for communications with the relevant RANs (e.g., 5G-NR RAN). The RF interface front ends 1017 and antennae 1019 are each configured to comply with the relevant PHY standards which it supports. The antenna(s) 1019 of the UEe radios may include multiple spatially diverse individual elements in e.g., a MIMO- or MISO-type configuration, such that spatial diversity of the received signals can be utilized. Moreover, a phased array or similar arrangement can be used for spatial resolution within the environment, such as based on time delays associated with signals received by respective elements.

In one embodiment, the processor apparatus 1002 may include one or more of a digital signal processor, microprocessor, field-programmable gate array, GPU, or plurality of processing components mounted on one or more substrates. The processor apparatus 1002 may also comprise an internal cache memory, and modem/baseband chipset 1003. The modem 1003 processes the baseband control and data signals for transmission and reception via the RF frond end module 1017.

As indicated, the UEe includes SI/LBT logic 1010 in the program memory, which is in communication with the processing subsystem, where the former may include memory which may comprise, e.g., SRAM, flash and/or SDRAM components. The memory module 1006 may implement one or more of direct memory access (DMA) type hardware, so as to facilitate data accesses as is well known in the art. The memory module of the exemplary embodiment contains one or more computer-executable instructions that are executable by the processor apparatus 1002. A mass storage device (e.g., HDD or SSD, or NAND/NOR flash or the like) is also provided as shown.

Other embodiments may implement the SI/LBT functionality within dedicated hardware, logic, and/or specialized co-processors (not shown).

As noted, the SI/LBT logic 1010 of the exemplary embodiment is configured to use the UE-based methodologies described previously herein for receipt and decode of SI messages (including extraction of SIBs and soft-combining where applicable).

The UEe 1000 may also be configured to utilize positioning location data generated by an internal receiver 1009 (e.g., GPS, GLONASS, or similar, or yet other operating principles) to transmit location data such as coordinates to a gNB, SMF, or other entity in support of location-related functions, although it will be appreciated that the UEe's location can also be derived by network-based means.

In some embodiments, the UEe also utilizes memory 1006 or other storage 1007 configured to at least temporarily hold a number of data relating to the various network associations, SI-message data and RNTI, LBT policies, bands and rules, in support of the various functions described herein. In other embodiments, application program interfaces (APIs) such as those included in an MSO-provided application or those natively available on the UEe may also reside in the internal cache or other memory 1006. Such APIs may include common network protocols or programming languages configured to enable communication with the UEe 1000 and other network entities.

Service Provider Networks

Figure 11:
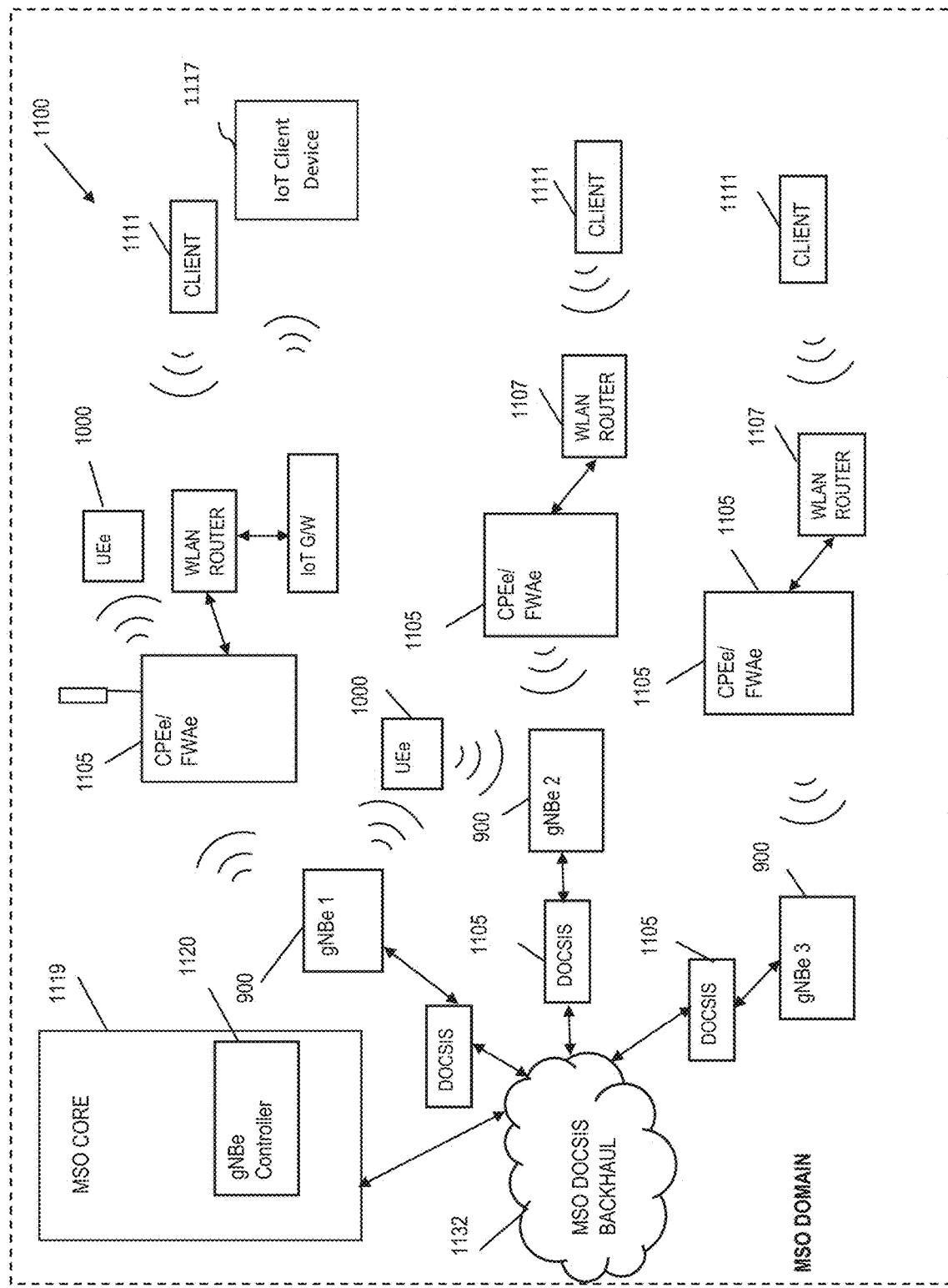
FIG. 11 is a functional block diagram of a first exemplary MSO network architecture useful in conjunction with various principles described herein.

FIG. 11 illustrates a typical service provider network configuration useful with the features of the apparatus and methods described herein. It will be appreciated that while described with respect to such network configuration, the methods and apparatus described herein may readily be used with other network types and topologies, whether wired or wireless, managed or unmanaged.

The exemplary service provider network 1100 is used in the embodiment of FIG. 11 to provide backhaul and Internet access from the service provider's wireless access nodes (e.g., Node B NR-U) devices such as the overlapping SI/LBT capable gNBe's 900 previously described herein, Wi-Fi APs, and FWA devices operated or maintained by the MSO), and one or more stand-alone or embedded cable modems (CMs) 1133 in data communication therewith. It will be appreciated that the gNBe and UEe devices described herein may operate on licensed, unlicensed, or quasi-licensed/shared access spectrum while utilizing the underlying 3GPP 5G NR/NR-U based protocols described herein.

The individual gNBe's 1100 are backhauled by the CMs 1105 to the MSO core via e.g., CMTS or CCAP MHAv2/RPD or other such architecture, and the MSO core 1132 includes at least some of the EPC/5GC core functions previously described, as well as an optional gNBe controller process 1120 as shown. The controller process is in one embodiment a network-based server which communicates with the various gNBe within the MSO infrastructure so as to effect various functions including in some cases the logic of FIGS. 3-8 as previously described; e.g., when/under what conditions to implement overlapping SI-window functionality. The controller 1120 can communicate with the gNBe's via the primary backhaul. The gNBe's 1100 may also be configured to fail to their internal logic when communication with the network controller process is lost, in effect self-moderating for decisions of SI/LBT and OSI management modes and operation.

While not shown, it will also be appreciated that the logic of the UEe 900 relating to LBT operation may also be communicative with and controlled at least in part by the network controller 1120 in some embodiments, such as via established connections between the UEe and one or more gNBe's, or alternatively via another backhaul such as WLAN link.

Client devices 1111 such as tablets, smartphones, Smart-TVs, etc. at each premises are served by respective WLAN routers 1107, IoT gateways 1117, and NR-U or CBRS capable CPE/FWA 1105, the latter which are backhauled to the MSO core or backbone via their respective gNBe's, and which themselves may be enhanced with SI/LBT capability to act in effect as fixed UEe 900.

Notably, in the embodiment of FIG. 11, all of the necessary components for support of the wireless service provision and backhaul functionality are owned, maintained and/or operated by the common entity (e.g., cable MSO). The approach of FIG. 11 has the advantage of, inter alia, giving the MSO complete control over the entire service provider chain so as to optimize service to its specific customers (versus the non-MSO customer-specific service provided by an MNO), and the ability to construct its architecture to optimize incipient 5G NR functions such as network slicing, gNB DUe/CUe Option "splits" within the infrastructure, selection or configuration of subsets or groups of gNBe (or their individual DUe) which can participate in coordinated UEe buffer management, RRC connection processes, etc.

Figure 12:
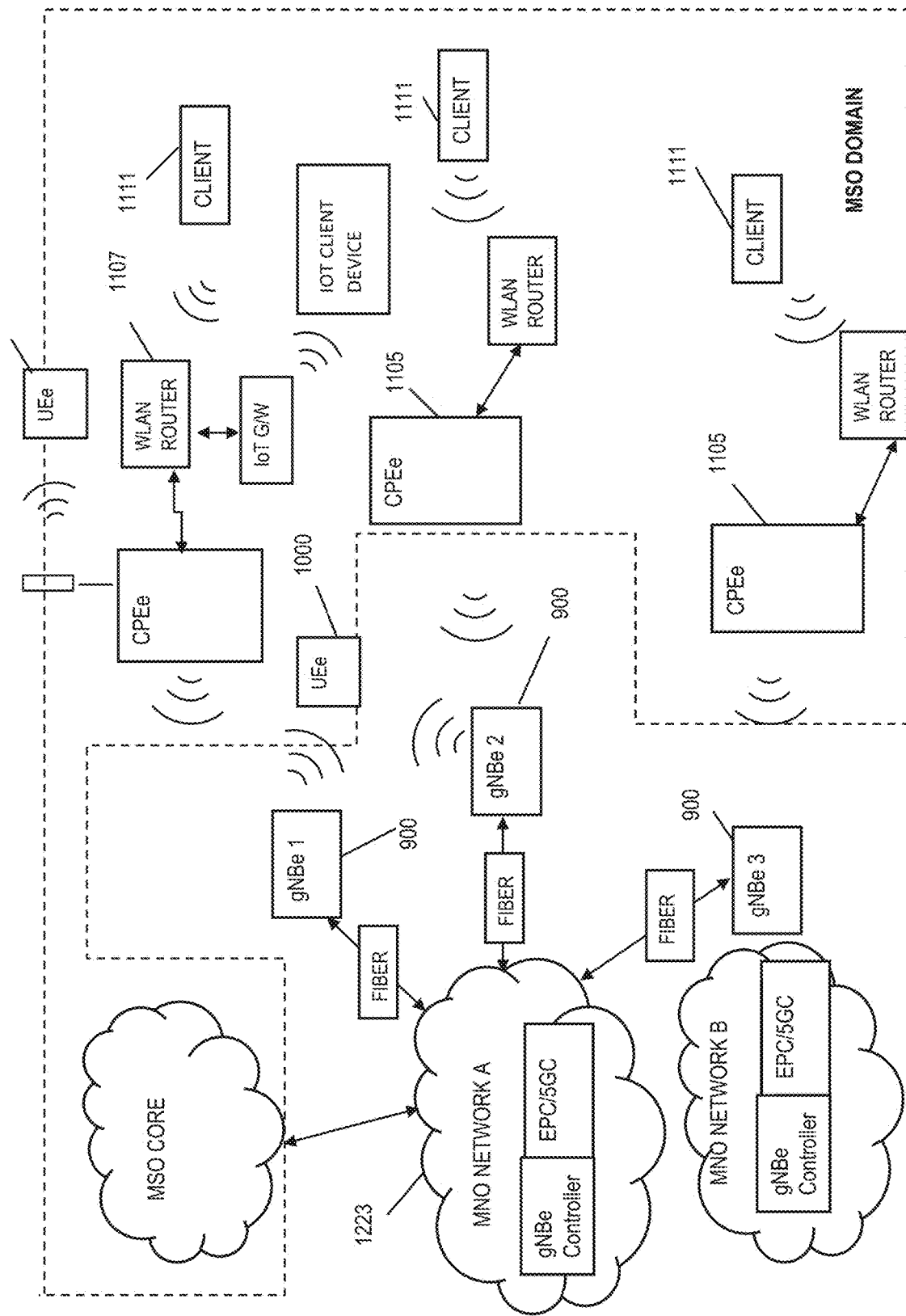
FIG. 12 is a functional block diagram of an exemplary MNO network architecture useful in conjunction with various principles described herein, wherein respective portions of the infrastructure are managed or operated by the MSO and one or more MNOs.

FIG. 12 illustrates another embodiment, highlighting one possible relationship between an MSO architecture and an MNO architecture. As shown, the MSO service domain extends only to the CPEe/FWAe and served premises and the MSO core functions, while other functions such as 3GPP EPC/E-UTRAN or 5GC and NG-RAN functionality, as well as gNBe and controller functions if utilized, are provided by one or more MNO networks 1232 operated by MNOs (may belong to the same or different operators), including in some embodiments with which the MSO has a service agreement. In this approach, the controller server 1120 is maintained and operated by the MNO (since the MNO maintains cognizance over the gNBe's 1100), although this is not a requirement, and the present disclosure contemplates embodiments where the controller function is maintained by the MSO or even a third party. The approach of FIG. 26 (i.e., coordination of MSO and MNO networks) has the advantage of, inter alia, avoiding more CAPEX by the MSO, including duplication of infrastructure which may already service the area of interest, including reduced RF interference due to addition of extra (and ostensibly unnecessary) gNBe's or other transceivers.

Hence, depending on what data is useful to the MSO or its customers, various portions of the foregoing can be associated and stored to particular gNBe "clients" or their components being backhauled by the MSO network, whether owned by the MSO, MNO, or another entity. These data can also be utilized by e.g., the controller or another network process in SI/LBT or OSI management processes for MUSIM UEe's within the infrastructure such as based on operational loading of a given gNBe or the network as a whole, UEe location relative to the gNBe's, subscriber account or subscription level or privileges, presence of other suitable backhauls for the UEe such as WLAN, 5G NR network slicing considerations, and/or yet other factors which will be recognized by those of ordinary skill in the wireless infrastructure arts given the present disclosure.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

Appendix A -

SI-SchedulingInfo

*The IE SI-SchedulingInfo contains information needed for acquisition of SI messages.*

SI-SchedulingInfo information element

```
-- ASN1START
-- TAG-SI-SCHEDULING-INFO-START

SI-SchedulingInfo ::=            SEQUENCE {
    schedulingInfoList           SEQUENCE (SIZE (1..maxSI-Message)) OF SchedulingInfo,
    si-WindowLength              ENUMERATED {s5, s10, s20, s40, s80, s160, s320, s640, s1280},
    si-RequestConfig             SI-RequestConfig                                            OPTIONAL,
-- Cond MSG-1
    si-RequestConfigSUL          SI-RequestConfig                                            OPTIONAL,
-- Cond SUL-MSG-1
    systemInformationAreaID      BIT STRING (SIZE (24))                                      OPTIONAL,
-- Need R
    ...
}

SchedulingInfo ::=               SEQUENCE {
    si-BroadcastStatus           ENUMERATED {broadcasting, notBroadcasting},
    si-Periodicity               ENUMERATED {rf8, rf16, rf32, rf64, rf128, rf256, rf512},
    sib-MappingInfo              SIB-Mapping
}

SIB-Mapping ::=                  SEQUENCE (SIZE (1..maxSIB)) OF SIB-TypeInfo

SIB-TypeInfo ::=                 SEQUENCE {
    type                         ENUMERATED {sibType2, sibType3, sibType4, sibType5, sibType6, sibType7, sibType8, sibType9,
                                 spare8, spare7, spare6, spare5, spare4, spare3, spare2, spare1,... },
    valueTag                     INTEGER (0..31)                                             OPTIONAL,
-- Cond SIB-TYPE
    areaScope                    ENUMERATED {true}                                           OPTIONAL
-- Need S
}

-- Configuration for Msg1 based SI Request
SI-RequestConfig::=              SEQUENCE {
    rach-OccasionsSI             SEQUENCE {
        rach-ConfigSI            RACH-ConfigGeneric,
        ssb-perRACH-Occasion     ENUMERATED {oneEighth, oneFourth, oneHalf, one, two, four, eight, sixteen}
    }                                                                                         OPTIONAL,
-- Need R
    si-RequestPeriod             ENUMERATED {one, two, four, six, eight, ten, twelve, sixteen} OPTIONAL,   -- Need R
    si-RequestResources          SEQUENCE (SIZE (1..maxSI-Message)) OF SI-RequestResources
}
```

```
SI-RequestResources ::=            SEQUENCE {
    ra-PreambleStartIndex              INTEGER (0..63),
    ra-AssociationPeriodIndex          INTEGER (0..15)                          OPTIONAL,
                                                                                -- Need R
    ra-ssb-OccasionMaskIndex           INTEGER (0..15)                          OPTIONAL
                                                                                -- Need R
}

-- TAG-SI-REQUESTRESOURCES-STOP
-- ASN1STOP
```

| SI-RequestConfig field descriptions |
|---|
| rach-OccasionsSI |
| Configuration of dedicated RACH Occasions for SI. If the field is absent, the UE uses the corresponding parameters configured in rach-ConfigCommon of the initial uplink BWP. |
| si-RequestPeriod |
| Periodicity of the SI-Request configuration in number of association periods. |
| si-RequestResources |
| If there is only one entry in the list, the configuration is used for all SI messages for which si-BroadcastStatus is set to notBroadcasting. Otherwise the 1st entry in the list corresponds to the first SI message in schedulingInfoList for which si-BroadcastStatus is set to notBroadcasting, 2nd entry in the list corresponds to the second SI message in schedulingInfoList for which si-BroadcastStatus is set to notBroadcasting and so on. Change of si-RequestResources should not result in system information change notification. |

| SI-RequestResources field descriptions |
|---|
| ra-AssociationPeriodIndex |
| Index of the association period in the si-RequestPeriod in which the UE can send the SI request for SI message(s) corresponding to this SI-RequestResources, using the preambles indicated by ra-PreambleStartIndex and rach occasions indicated by ra-ssb-OccasionMaskIndex. |
| ra-PreambleStartIndex |
| If N SSBs are associated with a RACH occasion, where N > = 1, for the i-th SSB (i=0, ..., N-1) the preamble with preamble index = ra-PreambleStartIndex + i is used for SI request; For N < 1, the preamble with preamble index = ra-PreambleStartIndex is used for SI request. |

| SchedulingInfo field descriptions |
|---|
| areaScope |
| Indicates that a SIB is area specific. If the field is not present, the SIB is cell specific. |
| si-Periodicity |
| Periodicity of the SI-message in radio frames. rf8 corresponds to 8 radio frames, rf16 corresponds to 16 radio frames, and so on. |
| si-RequestConfig |
| Configuration of Msg1 resources that the UE uses for requesting SI-messages for which si-BroadcastStatus is set to notBroadcasting. If the field is not present the UE uses Msg3 to request SI-messages for which si-BroadcastStatus is set to notBroadcasting (if any). |
| si-RequestConfigSUL |
| Configuration of Msg1 resources that the UE uses for requesting SI-messages for which si-BroadcastStatus is set to notBroadcasting. If the field is not present the UE uses Msg3 to request SI-messages for which si-BroadcastStatus is set to notBroadcasting (if any) on supplementary uplink. |
| si-WindowLength |
| The length of the SI scheduling window. s5 corresponds to 5 slots, s10 to 10 slots and so on. |
| systemInformationAreaID |
| Indicates the system information area that the cell belongs to, if any. Any SIB with areaScope within the SI is considered to belong to this systemInformationAreaID. The systemInformationAreaID is unique within a PLMN. |

| SchedulingInfo field descriptions |
|---|
| si-BroadcastStatus |
| Indicates if the SI message is being broadcasted or not. Change of si-BroadcastStatus should not result in system information change notifications in Short Message transmitted with P-RNTI over DCI (see clause 6.5). The value of the indication is valid until the end of the BCCH modification period when set to broadcasting. |

| Conditional presence | Explanation |
|---|---|
| MSG-1 | The field is optionally present, Need R, if si-BroadcastStatus is set to notBroadcasting for any SI-message included in SchedulingInfo. It is absent otherwise. |
| SIB-TYPE | The field is mandatory present if the SIB type is different from SIB6, SIB7 or SIB8. For SIB6, SIB7 and SIB8 it is not present. |
| SUL-MSG-1 | The field is optionally present, Need R, if this serving cell is configured with a supplementary uplink and if si-BroadcastStatus is set to notBroadcasting for any SI-message included in SchedulingInfo. It is absent otherwise. |

What is claimed is:

1. A wireless access node apparatus configured to manage system information (SI) transmission in a wireless network, the wireless access node apparatus comprising:
   a digital processor apparatus;
   a wireless network interface in data communication with the digital processor apparatus; and
   a computer readable storage apparatus in data communication with the digital processor apparatus and comprising a storage medium including at least one computer program configured to, when executed on the digital processor apparatus, cause the wireless access node apparatus to:
   invoke an overlapping SI-window protocol;
   based at least in part on the invocation of the overlapping SI-window protocol, scramble downlink control information using at least one overlapping SI-identifier; and
   transmit the scrambled downlink control information to at least one user device;
   wherein:
   the wireless access node apparatus comprises a 3GPP (3rd Generation Partnership Project)-compliant Firth Generation New Radio (5G NR) gNodeB (gNB) configured to employ aperiodic OSI data transmission; and
   the transmission of the scrambled downlink control information to the at least one user device comprises transmission, by the 3GPP 5G NR gNB, of OSI (other system information) data outside of a prescribed SI window, so as to compensate for any listen-before-talk (LBT) failures within the prescribed SI window.

2. The wireless access node apparatus of claim 1, wherein:
   the wireless access node apparatus comprises a 3GPP (3rd Generation Partnership Project)-compliant gNodeB (gNB);
   the at least one overlapping SI-identifier comprises a unique overlapping SI-RNTI (UOSI-RNTI (radio network temporary identifier)); and
   the scrambled downlink control information comprises one or more SI-messages, each of the one or more SI-messages comprising a single system information block (SIB).

3. The wireless access node apparatus of claim 2, wherein the UOSI-RNTI comprises a value within a variable range of 0001-0008.

4. The wireless access node apparatus of claim 2, wherein the UOSI-RNTI comprises a value within a variable range of 0009-FFEF.

5. The wireless access node apparatus of claim 2, wherein the UOSI-RNTI comprises a value associated with a one of a plurality of fields, the plurality of fields comprising FFF0-FFFD.

6. The wireless access node apparatus of claim 1, wherein the scrambling of the downlink control information with the at least one overlapping SI-identifier comprises scrambling of at least one SI-message with an identifier uniquely associated with a plurality of system information blocks (SIBs) within the at least one SI-message, the plurality of SIBs relating to each other.

7. A computerized method of providing system information in a wireless network, the computerized method comprising:
   allocating one or more first system information blocks (SIBs) into a first SI-message;
   scrambling the first SI-message with first distinguishing identifier data associated with the one or more first SIBs;
   initiating a first listen-before-talk (LBT) process for the first SI-message;
   based on a failure of the first LBT process:
   (i) aggregating the one or more first SIBs with one or more second SIBs into a second SI-message;
   (ii) scrambling the second SI-message with second distinguishing identifier data associated with both of the one or more first SIBs and the one or more second SIBs; and
   (iii) initiating a second LBT process for the second SI-message; and
   based on a success of the second LBT process, transmitting the scrambled second SI-message to one or more computerized user devices.

8. The computerized method of claim 7, further comprising, based on the failure of the first LBT process, transmitting data representative of a message to the one or more computerized user devices, the data representative of the message indicating an SI change.

9. A computerized method of providing system information in a wireless network, the computerized method comprising:
   determining to utilize a plurality of overlapping temporal windows for transmission of the system information;
   based on the determining, scrambling control information with distinguishing identifier data, the scrambling of the control information with the distinguishing identifier data comprising scrambling a system information (SI)-message with a unique overlapping system information radio network temporary identifier (OSI-RNTI) which by itself uniquely identifies a plurality of system information blocks (SIBs) within the SI-message, the plurality of SIBs categorized together based on a type of information carried thereby for aggregation into the SI-message; and
   transmitting the scrambled control information to one or more computerized user devices, the transmitting of the scrambled control information comprising transmitting the SI-message.

10. The computerized method of claim 9, wherein the determining to utilize the plurality of overlapping temporal windows comprises determining to utilize the plurality of overlapping temporal windows based at least on utilization of a prescribed wireless protocol.

11. The computerized method of claim 10, wherein the prescribed wireless protocol comprises a 3GPP (Third Generation Partnership Program) 5G (Fifth Generation) NR (New Radio)-Unlicensed (NR-U) protocol.

12. The computerized method of claim 9, wherein the determining to utilize the plurality of overlapping temporal windows comprises determining to utilize the plurality of overlapping temporal windows based on determining that an available bandwidth of an unlicensed carrier frequency or frequency band utilized in servicing the one or more computerized user devices meets or exceeds a pre-defined threshold.

13. The computerized method of claim 9, further comprising categorizing the plurality of SIBs together based on the type of information carried thereby for the aggregation into the SI-message, the categorizing utilized to reduce a number of SIB combinations, thereby reducing a number of unique OSI-RNTI's that the one or more computerized user devices needs to attempt to verify.

14. The computerized method of claim 9, further comprising categorizing the plurality of SIBs together based on the type of information carried thereby for the aggregation into the SI-message, the categorizing comprising categorizing the plurality of SIBs together based on all of the plurality of SIBs carrying information relating to cell re-selection.

15. The computerized method of claim 9, further comprising categorizing the plurality of SIBs together based on the type of information carried thereby for the aggregation into the SI-message, the categorizing comprising categorizing the plurality of SIBs together based on all of the plurality of SIBs carrying information relating to emergency information.

16. The computerized method of claim 9, further comprising categorizing the plurality of SIBs together based on the type of information carried thereby for the aggregation into the SI-message, the categorizing comprising categorizing the plurality of SIBs together based on all of the plurality of SIBs carrying information relating to re-selection information for NR cells and excluding an SIB having information for E-UTRA cells.

17. The computerized method of claim 9, further comprising categorizing the plurality of SIBs together based on the type of information carried thereby for the aggregation into the SI-message, the categorizing comprising categorizing the plurality of SIBs together based on all of the plurality of SIBs carrying information relating to (New Radio) NR intra- and inter-frequency neighbor cells.

18. The computerized method of claim 9, further comprising categorizing the plurality of SIBs together based on a combination of at least one SIB from a then-current SI-window and one or more SIBs from one or more previous SI-windows.

19. The computerized method of claim 9, further comprising enabling soft-combining by repeating the SI-message across an SI-window.

20. The computerized method of claim 9, wherein the unique OSI-RNTI that uniquely identifies the plurality of SIBs within the SI-message comprises SI23-RNTI for an SI-message that contains SIB2 and SIB3.

21. Computer readable apparatus comprising a non-transitory storage medium, the non-transitory storage medium comprising at least one computer program having a plurality of instructions, the plurality of instructions configured to, when executed on a processing apparatus of a wireless access node apparatus, cause the wireless access node apparatus to:
  determine to utilize a plurality of overlapping temporal windows for transmission of system information;
  based on the determination, cause scrambling of control information with distinguishing identifier data, the distinguishing identifier data comprising a unique overlapping system information radio network temporary identifier (UOSI-RNTI) having a value within a range of FFF0-FFFD inclusive, the range of FFF0-FFFD inclusive limiting a number of system information blocks (SIBs) to fewer than thirteen (13); and
  transmit the scrambled control information to one or more computerized client devices.

22. The computer readable apparatus of claim 21, wherein the scrambling of the control information with the distinguishing identifier data comprises scrambling of one or more system information (SI)-messages, each of one or more SI-messages only having one system information block (SIBs) contained therein.

23. The computer readable apparatus of claim 21, wherein the plurality of instructions are further configured to, when executed on the processing apparatus of the wireless access node apparatus, cause the wireless access node apparatus to:
  cause transmission of notification data to the one or more computerized client devices, the notification data configured to enable a notification of one or more impending SI updates.

* * * * *